(12) United States Patent (10) Patent No.: US 8,837,514 B2
Bareis (45) Date of Patent: Sep. 16, 2014

(54) BROADBAND MULTI-DROP LOCAL NETWORK, INTERFACE AND METHOD FOR MULTIMEDIA ACCESS

(71) Applicant: Bernard F. Bareis, Plano, TX (US)

(72) Inventor: Bernard F. Bareis, Plano, TX (US)

(73) Assignee: Bernard F. Bareis, Plano, TX (US)

( * ) Notice: Subject to any disclaimer, the term of this patent is extended or adjusted under 35 U.S.C. 154(b) by 18 days.

(21) Appl. No.: 13/663,656

(22) Filed: Oct. 30, 2012

(65) Prior Publication Data

US 2013/0051230 A1 Feb. 28, 2013

Related U.S. Application Data

(63) Continuation of application No. 12/050,755, filed on Mar. 18, 2008, now Pat. No. 8,300,654, which is a continuation of application No. 10/341,148, filed on Jan. 13, 2003, now Pat. No. 7,346,071.

(51) Int. Cl.
*H04L 12/413* (2006.01)
*H04M 11/06* (2006.01)
*H04L 12/28* (2006.01)
*H04L 12/24* (2006.01)
*H04L 12/801* (2013.01)
*H04L 12/853* (2013.01)

(52) U.S. Cl.
CPC ......... *H04M 11/062* (2013.01); *H04L 12/2898* (2013.01); *H04L 12/413* (2013.01); *H04L 12/2439* (2013.01); *H04L 47/10* (2013.01); *H04L 12/2803* (2013.01); *H04L 47/13* (2013.01); *H04L 12/2856* (2013.01); *H04L 12/2801* (2013.01); *H04L 47/2416* (2013.01)
USPC ............................ 370/445; 370/257; 370/356

(58) Field of Classification Search
CPC .............. H04L 5/0066; H04L 12/2439; H04L 12/2801; H04N 7/173; H04Q 11/0428
USPC ......... 370/285, 300, 401, 420, 419, 485, 445, 370/257, 356
See application file for complete search history.

(56) References Cited

U.S. PATENT DOCUMENTS

| | | | | |
|---|---|---|---|---|
| 4,597,082 | A | * | 6/1986 | Hill et al. ...................... 714/748 |
| 4,670,888 | A | | 6/1987 | Smith, III |
| 5,436,890 | A | | 7/1995 | Read et al. |
| 5,446,735 | A | | 8/1995 | Tobagi et al. |
| 5,500,853 | A | | 3/1996 | Engdahl et al. |
| 5,635,980 | A | * | 6/1997 | Lin et al. ......................... 725/131 |
| 5,756,280 | A | * | 5/1998 | Soora et al. .................... 725/146 |
| 5,896,382 | A | | 4/1999 | Davis et al. |
| 5,936,963 | A | | 8/1999 | Saussy |

(Continued)

OTHER PUBLICATIONS

Wallich, "Digital Hubbub," IEEE Spectrum, Jul. 2002; pp. 26-31.

*Primary Examiner* — Ricky Ngo
*Assistant Examiner* — Dewanda Samuel
(74) *Attorney, Agent, or Firm* — Howison & Arnott, LLP

(57) ABSTRACT

A broadband multi-drop local network, interface and method for multimedia access. A local network architecture include a wired bus coupleable directly to an external data network terminal and configured for carrying broadband packetized data traffic over a frequency spectrum uninterrupted by other defined data channels or services; and one or a plurality of network transceivers operable individually for coupling an addressable network device processing a defined class of information to the bus wherein each network appliance is configured for and further operable for providing communication interfacing of the class of information of each addressable network appliance with the packetized IP data traffic on the wired bus.

19 Claims, 16 Drawing Sheets

(56) References Cited

U.S. PATENT DOCUMENTS

| | | |
|---|---|---|
| 5,963,595 A | 10/1999 | Graham et al. |
| 5,991,292 A | 11/1999 | Focsaneanu et al. |
| 6,081,536 A | 6/2000 | Gorsuch et al. |
| 6,085,236 A | 7/2000 | Lea |
| 6,092,128 A | 7/2000 | Maas et al. |
| 6,115,468 A | 9/2000 | De Nicolo |
| 6,148,006 A | 11/2000 | Dyke et al. |
| 6,161,134 A | 12/2000 | Wang et al. |
| 6,218,931 B1 | 4/2001 | Asghar et al. |
| 6,272,209 B1 | 8/2001 | Bridger et al. |
| 6,424,646 B1 | 7/2002 | Gerszberg et al. |
| 6,542,500 B1 * | 4/2003 | Gerszberg et al. ............ 370/354 |
| 6,636,505 B1 | 10/2003 | Wang et al. |
| 6,714,545 B1 * | 3/2004 | Hugenberg et al. ........ 370/395.1 |
| 6,813,277 B2 | 11/2004 | Edmon et al. |
| 6,862,349 B1 | 3/2005 | Beveridge |
| 6,882,714 B2 * | 4/2005 | Mansfield ................ 379/142.14 |
| 6,925,091 B1 * | 8/2005 | Sjoberg et al. ................ 370/463 |
| 6,925,300 B2 | 8/2005 | Horne |
| 6,961,335 B1 | 11/2005 | Millet et al. |
| 7,010,002 B2 | 3/2006 | Chow et al. |
| 7,031,335 B1 | 4/2006 | Donohue et al. |
| 7,127,734 B1 | 10/2006 | Amit |
| 7,149,188 B2 | 12/2006 | Wilson |
| 2002/0037004 A1 * | 3/2002 | Bossemeyer et al. ......... 370/356 |
| 2003/0074670 A1 | 4/2003 | Penk et al. |
| 2004/0172658 A1 | 9/2004 | Rakib et al. |
| 2004/0196857 A1 | 10/2004 | Holloway et al. |
| 2005/0120375 A1 | 6/2005 | Elms |
| 2006/0159116 A1 | 7/2006 | Gerszberg et al. |

\* cited by examiner

US 8,837,514 B2

BROADBAND MULTI-DROP LOCAL NETWORK, INTERFACE AND METHOD FOR MULTIMEDIA ACCESS

CROSS REFERENCE TO RELATED APPLICATIONS

This application is a Continuation of U.S. patent application Ser. No. 12/050,755, filed Mar. 18, 2008, issuing as U.S. Pat. No. 8,300,654 on Oct. 30, 2012, and entitled "BROADBAND MULTI-DROP LOCAL NETWORK, INTERFACE AND METHOD FOR MULTIMEDIA ACCESS," which is incorporated herein by reference. application Ser. No. 12/050,755 is a Continuation of U.S. patent application Ser. No. 10/341,148, filed Jan. 13, 2003, now U.S. Pat. No. 7,346,071, issued on Mar. 18, 2008, and entitled "BROADBAND MULTI-DROP LOCAL NETWORK, INTERFACE AND METHOD FOR MULTIMEDIA ACCESS," which is incorporated herein by reference.

TECHNICAL FIELD OF THE INVENTION

The present disclosure relates in general to the field of network communications technology, and more particularly, to a broadband, packet-based wireline local network technology for connecting a local service provider or multiple service providers with one or more of a variety of electronic devices located in a user site.

BACKGROUND OF THE INVENTION

IP technology is beginning to migrate from the long haul networks into the edge network carriers that are, in-turn, in the early stages of offering a variety of broadband services to business and residential customers. Such broadband services are delivered at the user site via wideband coaxial cable or fiber optic cable, both of which are relatively expensive compared to twisted-pair copper wire and require complex and costly interface equipment to install devices thereto. For small business and home networks, installation costs must be low, with high reliability or predictability of operation, both of which are characteristic of wired systems over short distances. Service providers, because of operational, hardware or time-to-market costs and high capital investments required, are reluctant to make any major changes in their outside plant infrastructure or equipment.

Present high speed data services are provided via the digital subscriber line (DSL) family of technologies such as ADSL, VDSL, HDSL, and IDSL. As is well-known, present DSL services have limited bandwidth and data transfer capabilities and are point-to-point services, i.e., service a single device on a line or channel. The limitation of the point-to-point aspect of these DSL delivery systems is that they do not allow for multiple devices or for the network to be directly connected or interconnected. For example, an ADSL (Asymmetric DSL) link consists of a connection from a DSL Access Multiplexer (DSLAM) located in a telephone company central office to an ADSL modem located in a residence or business. If multiple computers at the location of the end user are to be connected together and to the service provider, then the ADSL modem is tied to an additional network within the user site which provides the link between the computers within the user site and to the ADSL modem. The ADSL modem, in turn, transfers data between the user site and the central office. An illustration of such a prior art network is provided in FIG. 6 described hereinbelow.

Referring now to FIG. 6 there is illustrated a typical example of a prior art local network as might be found in a small business or home-user environment. A local network 670 is typically contained within a building or other structure and is coupled through a demarcation point 682 and outside plant wiring 608 to an ADSL modem 606 in the facilities of an interconnect company 604 which provides access to the Internet 602 or, alternatively, a wide-area network (WAN). From demarcation point 682, the premises wiring 684 is coupled to an ADSL modem 612 which demodulates and converts incoming data signals to the data format used by the illustrative Ethernet system utilized in the local network 670. In the Ethernet system, the modem output may be coupled via 10/100 Mbps Ethernet link 614 to a router 616 and thence via link 618 to an Ethernet hub 620 for distribution to individual terminals 610a, 610b, ... 610n via links 622 connected to the hub 620. Alternatively, the function of the hub 620 could be achieved using a switch 620, as is well known in the field.

Referring further to FIG. 6, it will also be appreciated that the prior art system shown therein has the disadvantage in that it requires a complete local network 670—i.e., a secondary network coupled to the network provided by the interconnect company 604—in order to link a plurality of devices to a single demarcation 682 of a small business or home-use system as contained in a building. Further, in a typical secondary network such as an Ethernet system, the variety of devices to which it may be connected is limited to computers and peripherals thereto, and perhaps telephone equipment (not shown). Yet another disadvantage is the limitation in data rate of the high speed link connected to the user site to 6 or 8 Mbps, which is not adequate for a digitized NTSC video signal plus required overhead of the high speed link.

It is also characteristic of many of the existing broadband network technologies that they do not operate at data rates required for handling multiple channels of video. For example, it is well known that a single channel of standard NTSC video requires 6 to 8 Mbps, and a single channel of high definition (HDTV) video requires 16 to 20 Mbps, when digitized for transmission on a data link. Moreover, these data rates do not include the IP overhead required for digital transmission which can add significantly to these figures. For example, approximately 100 Mbps capability would be required to provide two channels of digitized HDTV simultaneously, one channel to each of two high definition television receivers. Thus, very high data rates are required for providing multimedia services such as "video on demand" or "video broadcasting" in order to ensure transfer of the data at the required packet data rate. Of the existing technologies, VDSL (Very-high-data-rate DSL) and data cable most nearly approach the bandwidth requirements for this type of service; however, neither VDSL (which is limited to 30 MHz bandwidth) or IP-based data cable configurations provide multi-drop capability. Multi-drop capability is very important when considering low-cost and high volume consumer or business applications. Moreover, the increased cost and complexity of existing high speed data distribution technologies act as a barrier impeding the rapid deployment of broadband services in small business or residential applications.

A further aspect of data networks that must be addressed in any broadband network handling real-time data traffic is the quality of service or QoS requirement. QoS, loosely defined, is another name for the design specifications of a data and/or telecommunications network in terms of traffic densities, call priorities, bit error rate (BER), delay and other parameters. QoS thus provides for configuring the network to handle the anticipated traffic, giving consideration to session duration, data volume, priorities, the number of channels available, network traffic densities at peak times or average times, the allowable number of blocked access attempts, the rate of growth of data traffic, etc. In QoS these considerations are processed to enable the best possible utilization of resources of the network for both real-time and non real-time data traffic in a variety of multimedia classes of services such as voice, audio/video data, interactive data, non-interactive data, etc. Properly applied, QoS is "engineered" into each portion of a network intended to carry real time data traffic. However, in the case of individual users or businesses having a need to implement a small, high-speed local network on its side of the demarcation to the premises, or its side of the curb-side "box," in an effort to provide real-time data communication in, out and within the network, the risk of incompatible equipment and protocols is high, which may result in poor performance. This problem is especially acute when real-time data, high bandwidth/high data rates and a multiplicity of devices are present on the local network. Engineering QoS in a small local network has heretofor been relatively expensive and additionally required specialized knowledge. What is needed, therefore, is a way to provide a local network within, e.g., one hundred meters (100 m) of the curbside terminal, that provides an economical, simple-to-install and use, network facility having full bandwidth, maximum data rates, has multidrop capability and has engineered QoS built-in to provide management of real-time data traffic.

SUMMARY OF THE INVENTION

There is disclosed herein a local network architecture, comprising a wired bus coupleable directly to an external data network terminal and configured for carrying broadband packetized IP data traffic over an electromagnetic spectrum uninterrupted by other defined data channels or services; and one or a plurality of addressable network devices coupled respectively to the wired bus via individual network transceivers, wherein each addressable network device is operable for processing a defined class of information to the bus and wherein each network appliance is further configured for providing communication interfacing of the defined class of information of each addressable network appliance with the packetized data traffic on the wired bus. In another aspect, the addressable network device comprises an addressable digital device.

In a further aspect there is disclosed an interface transceiver for operably coupling an addressable network device to a broadband wireline local network, comprising a broadband modem, coupled via a physical interface to the broadband wireline local network, for demodulating incoming packetized data from the network and modulating data output from the addressable network device to form packetized data to the broadband wireline local network; a network controller, coupled between the broadband modem and a communication interface with the addressable network device, for performing media access control (MAC) with error correction, carrier sense multiple access with collision detection (CSMA/CD), and quality of service (QoS) affecting data traffic through the transceiver; and a communication processor, disposed integrally with the communication interface with the addressable network device and configured to process data traffic between the network controller and the addressable network device.

BRIEF DESCRIPTION OF THE DRAWINGS

A more complete understanding of the present invention and advantages thereof may be acquired by referring to the following description, taken in conjunction with the accompanying drawings, in which like reference numbers indicate like features, and wherein.

DETAILED DESCRIPTION OF THE INVENTION

System Overview

Figure 1:
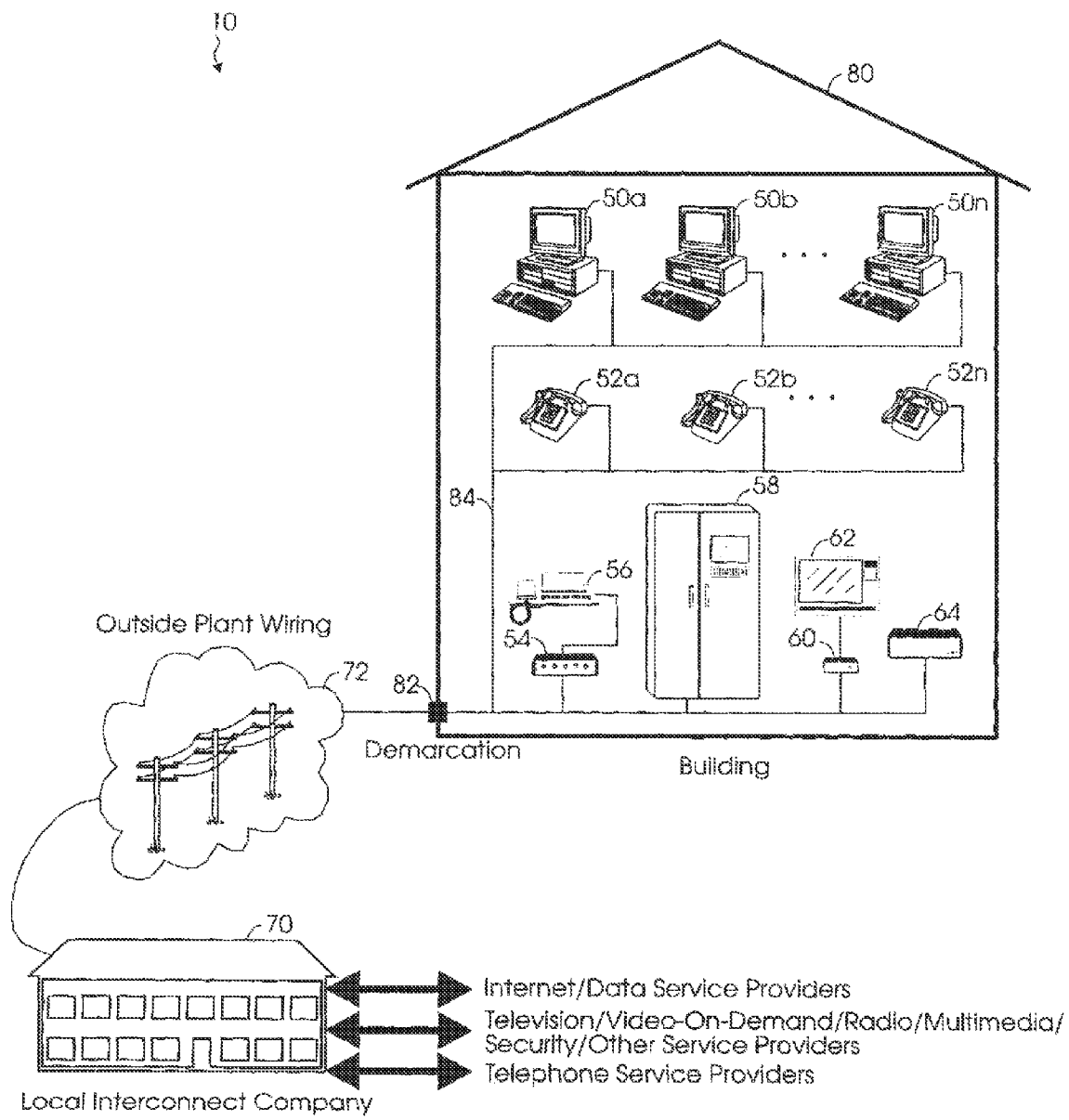
FIG. 1 illustrates a pictorial diagram of a first embodiment of a broadband multi-drop network in accordance with the present disclosure.

For small local networks seeking to handle very high data rates, wherein the data is transported in real time among multiple devices sharing the same wideband medium, several technologies can be utilized to provide the simple but high performance broadband multidrop local network of the present disclosure. These include, for example, the physical (PHY) and data link (e.g., media access control or MAC) layers of the OSI 7-layer reference network model, QoS requirements, and broadband modulation techniques of wireless telecommunications.

The broadband multidrop local network to be described hereinbelow may be thought of as a full spectrum network system which includes the following principal structural attributes: a wired bus carrying broadband modulated RF data traffic, addressable network devices such as addressable digital devices or appliances connected to the bus and a network interface within or associated with each connected device. The bus in the present network, preferably constructed of twisted pair copper wire, carries no competing services or adjacent networks and, although the present wired bus has no restricted bandwidth segments, it is anticipated that power level limitations may be imposed by regulatory agencies in certain bands. The bandwidth available is thus essentially unrestricted over the entire spectrum to at least several hundred MHz and beyond, allowing substantial volumes of traffic of correspondingly high data rates. With current technologies, data rates extending into the 500 to 1000 Mbps range may be readily utilized over reasonable distances. This broadband wired bus, as thus configured, can carry any amount of packetized data up to its capacity, among any number of compatible devices connected to the multidrop network.

When describing data communication over a bus or any type of communication medium that handles packetized data, the concept of "data traffic" must be understood. When a packet of data is assembled, it is assembled into a data packet of a defined "length" of data bits. The time that is required for this data packet to be transmitted is a function of the rate at which data bits are transmitted, or the "bit rate." Then there is the "packet rate" at which data must be transmitted for a given application. For example, in a real time video application, there must be a certain number of packets of data transmitted in a given frame or that frame can not be assembled at the receiving end. The wired medium or bus must first have a bandwidth that will handle the bit rate. Then a determination must be made whether the bit rate is fast enough to transmit at the packet rate. If so, then there is no problem meeting the data transmission requirements for the device. However, if there is a sharing arrangement with another device, then the packet rates for both devices will need to be accommodated. In order for both devices to be ensured full access to the bus for transfer of data packets at the respective device packet rates, there must be a data traffic capability equaling the total of the two rates. Of course, this assumes that the bit rates are the same. If the bit rates are different, there must be an accommodation made. There will then be required a defined amount of the data traffic capabilities of the bus to be reserved for transmission of packets for any given device. By way of example, data traffic will be defined as the number of data packets of any length that can be transmitted during a normalized unit of time. If a first device required forty percent of that normalized unit of time to ensure that all of its data packets would be accurately transmitted, then only sixty percent would be left for other devices. It may be that the first device transmitted one hundred data packets during that forty percent and that another device transmitted only a single long packet over the last sixty percent. Thus, the data traffic capability of this configuration would only accommodate those two devices. It is noted that, if the second device is not active, then sixty percent of the data traffic capabilities of the bus will not be utilized. However, as will be described hereinbelow, this is reserved for the sixty percent device when such device needs that data traffic capability so as to allow it to transfer data packets at its full packet rate.

A wide variety of addressable network devices or addressable digital devices or appliances that are capable of communicating via high speed data may be coupled together in the broadband multidrop local network of the present disclosure. Each such network device or appliance is coupled directly to the network bus via its own network interface— which includes a broadband transceiver—that is configured for "plug and play" installation by the user. Each network device may, for example, further include a label stating its data rate requirements in bits per second and its requirements for packet transfer rate as one technique for implementing network engineering, which provide information as to how much of the data traffic capabilities of the network will need to be reserved to ensure that all data packets can be transferred at rated data rate and packet transfer rate. The user would merely add up the numbers for all the connected network devices to determine the capacity utilization of the broadband multidrop local network. Other methods of network engineering to accomplish QoS requirements could include, but not be limited to: (a) user notification by network attached devices, indicating that real-time throughput is being affected and that network congestion is occurring; and (b) user notification via attached network devices which obtain real-time throughput status and statistics via a network address associated with the service provider interface (i.e., the network interface from the service provider that connects to the broadband multidrop network). Since no separate modem is required to couple the broadband multidrop local network to the interconnect service provider, each digital data device or appliance is effectively directly connected to the interconnect service provider.

The network interface or broadband transceiver utilized in or associated with each network device or appliance is configured to provide high throughput of real-time data at maximum packet transfer rate and present minimal delay for non real-time data on the network. The system, in a preferred embodiment, employs a variant of orthogonal frequency division multiplexing (OFDM), a specialized, packet-based, multiple subcarrier modulation scheme that emulates many of the attributes of spread spectrum modulation, in combination with carrier sense multiple access/carrier detect (CSMA/CD) protocols to manage the data traffic on the bus. Of course, the network architecture is not intended to be limited to the use of a multiple subcarrier modulation scheme and other modulation schemes capable of transporting broadband packetized data in a wired network among a plurality of addressable devices may be used. Further, quality of service, QoS, is engineered into the system and may be automated as an integral component in each network interface.

Description of a First Embodiment

Referring now to FIG. 1, there is illustrated a first embodiment of a broadband multidrop local network 10 consistent with the present disclosure. Typically, network 10 may include a twisted-pair wire bus as exists in the outside plant 72 of a local interconnect company 70, such as a telephone company local exchange carrier (LEC), cable company office, or the like. Alternatively, the outside plant media could consist of coaxial cable in a cable network. It is also conceivable that optical versions of the embodiments of the present disclosure could be deployed using optical fiber to transport the data in the network.

The broadband multidrop local network 10 of the present disclosure includes the bus medium or wiring 84 within the end user site or building 80 attached at demarcation point 82. A wired network carrying modulated data traffic spanning the radio frequency range has the advantage that a radio station site license, e.g. from a government authority, is not required as it would be for some wireless technologies. However, in most applications, compliance with RF emissions regulations may be required. A wired network as disclosed herein also has the ability to supply operating power such as DC voltage or low frequency AC voltage to each addressable digital device or appliance via the wired bus. While FIG. 1 illustrates a single location or building 80, in other embodiments, network 10 could be connected to a plurality of locations. For example, a broadband multidrop local network in a rural area, providing connection to multiple user sites in conjunction with compatible telephone systems, could be used to create separate virtual lines to replace existing party lines. Using the single twisted-pair outside plant and user site wiring, telephone systems and telephone company equipment provided according to the present disclosure may be economically implemented to provide separate calling facilities for each location.

Figure 4:
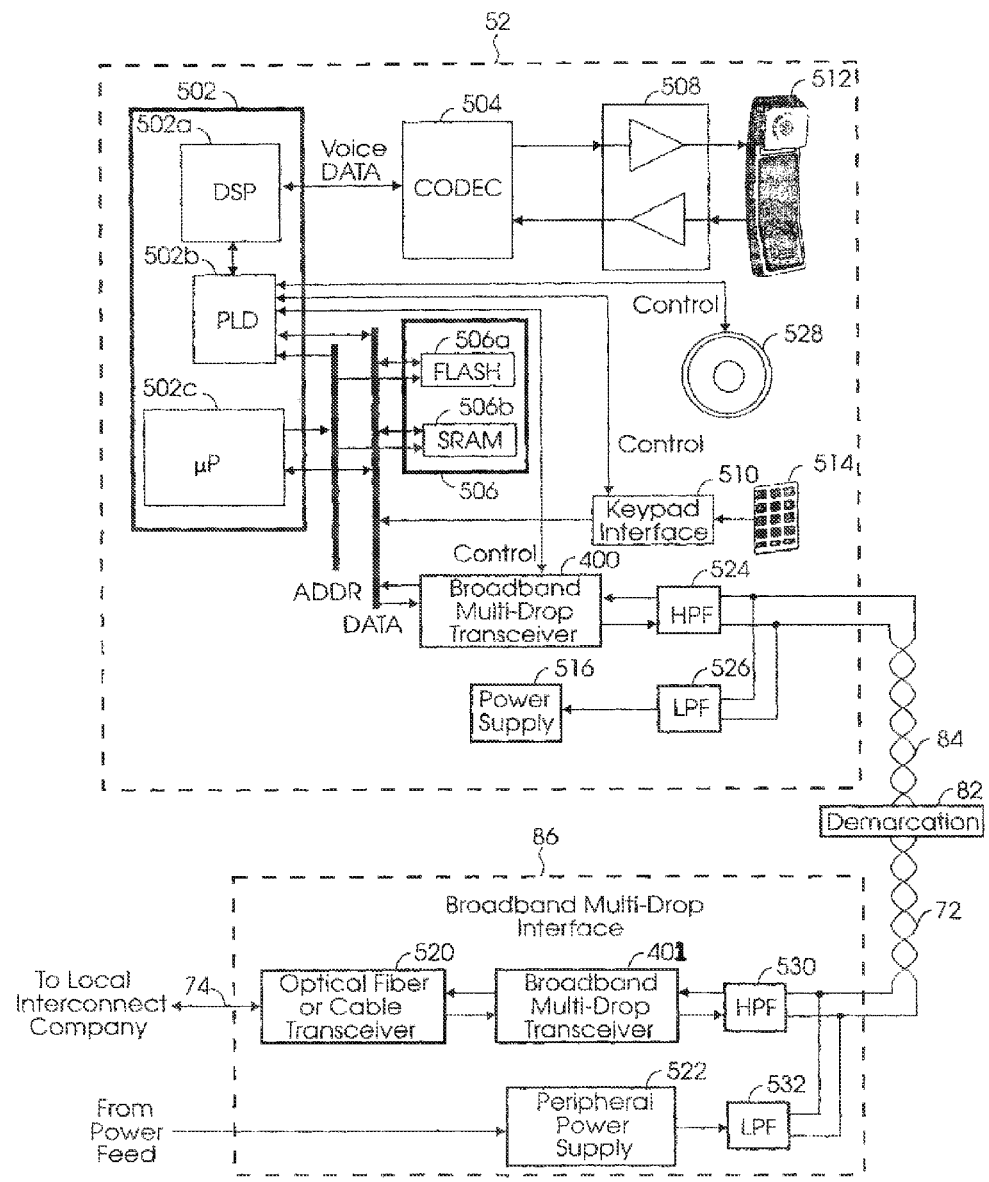
FIG. 4 is a block diagram showing the components of a broadband multidrop network interface and the components of a compatible telephone set, and the interconnection thereof as are included in the illustration of FIG. 2.
Figure 5:
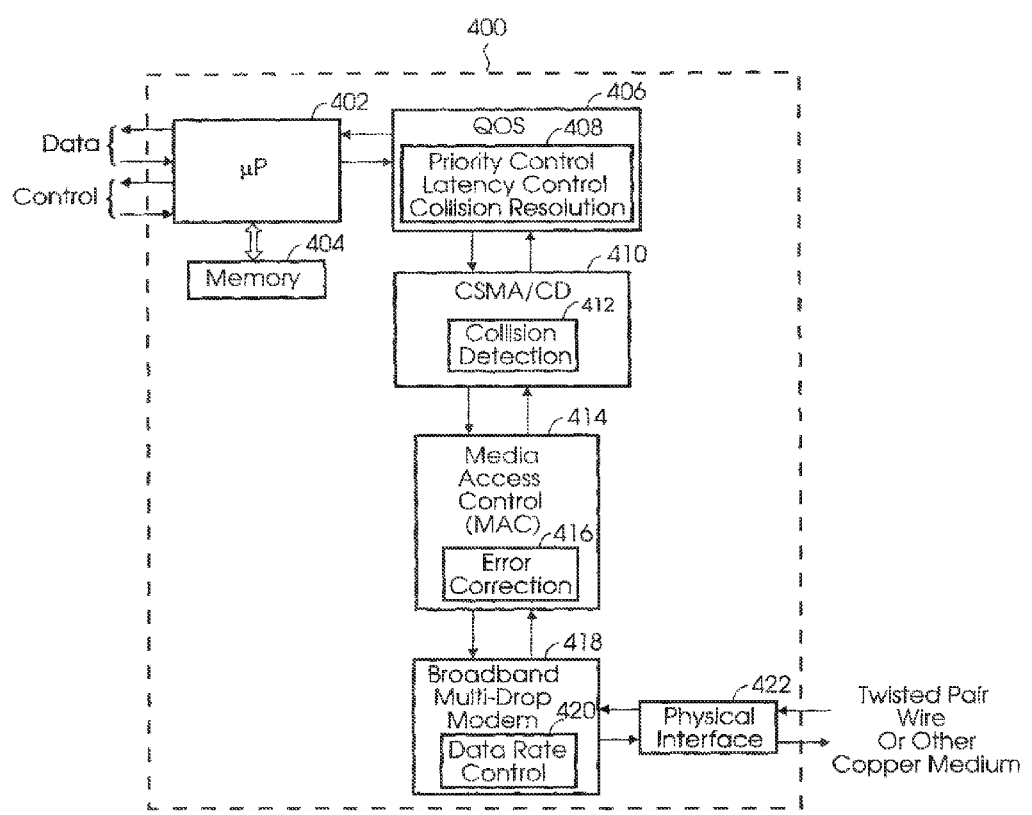
FIG. 5 is a block diagram showing the components of a broadband multidrop network transceiver.
Figure 6:
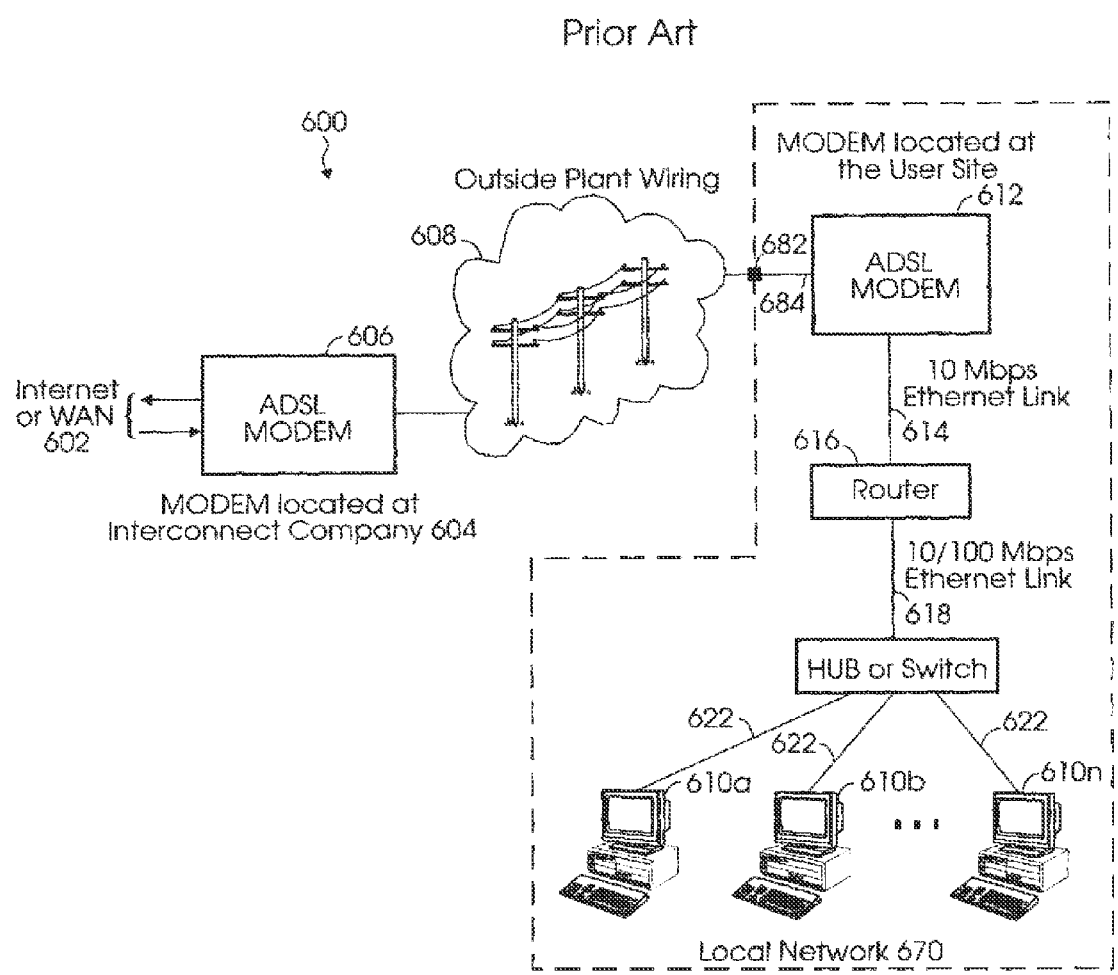
FIG. 6 is a pictorial block diagram of a prior art local network system.

Referring further to FIG. 1, a building 80 contains a number of addressable network devices to be networked via interconnecting twisted-pair wire 84 to the local interconnect company 70 via the demarcation point 82 and the outside plant wiring 72. Devices that may be used on the network 10 must be compatible with the network transceiver 400 as shown in FIGS. 4 and 5 to be described hereinbelow. Such network devices may include, but are not limited to, computer systems 50 (a) . . . (n), telephone sets 52 (a) . . . (n), digital set top equipment 60, loop-start interface equipment 54, network-ready appliances 58, and security systems 64. Although not shown, other network devices such as television sets, high fidelity audio equipment, DVD or VCR devices, security cameras, utility metering equipment, facsimile machines, etc., each having a built-in addressable network interface 400, may also be connected to the network 10.

The local interconnect company 70 distributes packetized IP traffic such as the well-known Internet protocol (IP) for computers, or voice over Internet protocol (VOIP) for telephony, between various service providers and the user site. For another example, IP-based television broadcast service data distributed as streaming data can be routed to set top equipment 60 to be converted to video and audio signals compatible with a television set 62. In this example, a single television set 62 and set top equipment 60 are shown. In actual implementations, one or more of each device may be used and the functions of television set 62 and set top equipment 60 may be integrated into a single device. Another example is the routing of digitized and packetized telephony traffic between a telephone company service provider and at least one telephone set 52. The telephone company service provider may provide long distance capabilities, local calling capabilities or a combination thereof. Still another example consists of computers 50 (a) . . . (n) connected to the network 10. The computers 50 (a) . . . (n) may intercommunicate using IP packets or communicate to and from at least one Internet service provider operating through a local interconnect company 70. Yet another example is the routing of data traffic to communicate between the user site and security services. The examples given are illustrative of the many possible uses for the network of the present disclosure and are not intended to be limiting.

Figure 2:
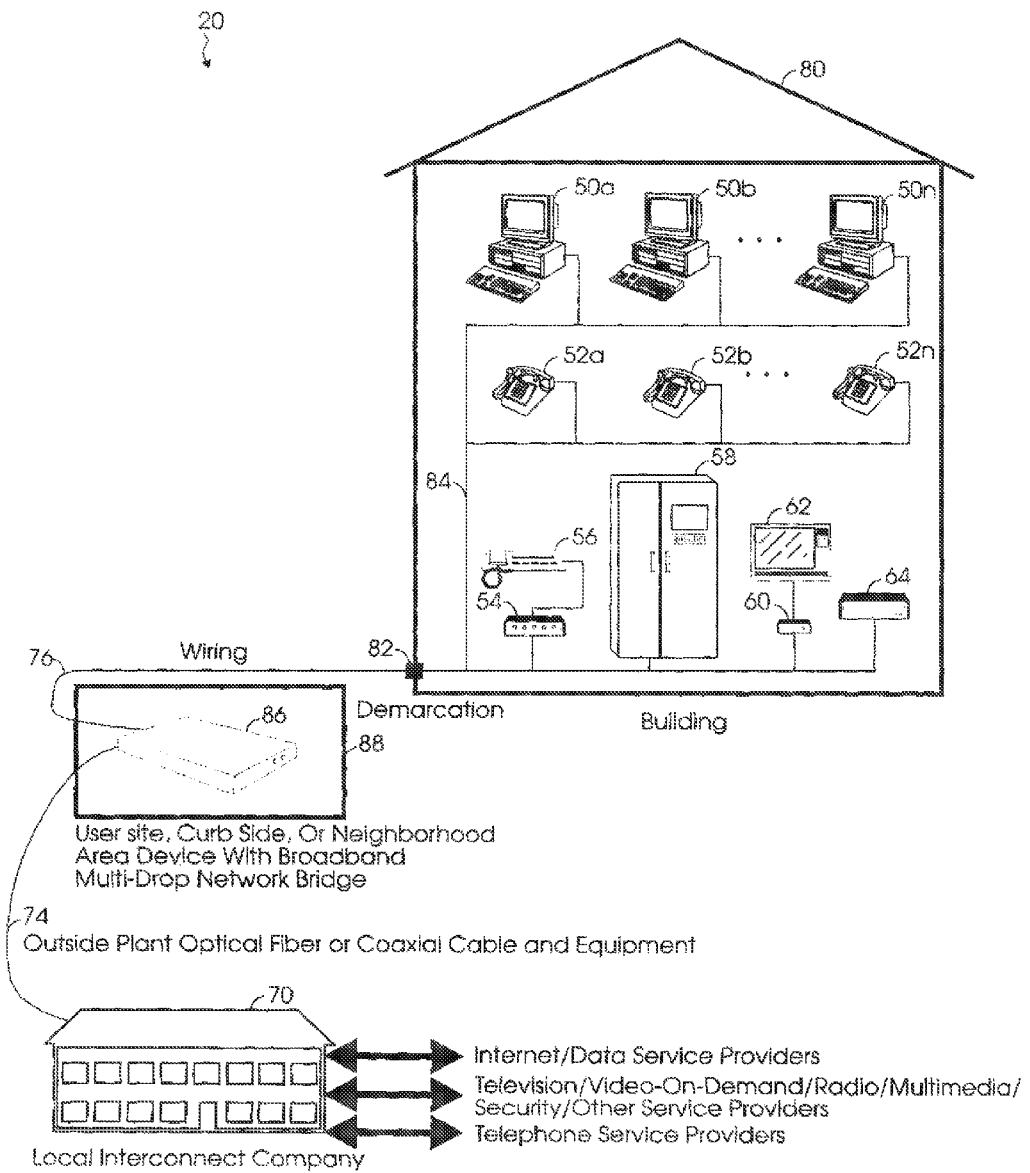
FIG. 2 illustrates a pictorial diagram of an alternate embodiment of a network in accordance with the present disclosure showing a configuration for optimum data rates.

Network 10 as illustrated in FIG. 1 will typically have a lower data rate compared with the network 20 of FIG. 2, given the same modulation scheme and data transfer technology because of the length of twisted pair wiring in the outside plant, the lack of a separate interface, susceptibility to external electromagnetic fields, etc. or a combination of the above. In an actual application of FIG. 1, the outside plant wiring 72 will likely be on the order of a few miles. Signal attenuation and reflections of the high frequencies occurring in the network 10 of FIG. 1 as well as external interference impinging upon outside plant wiring will decrease data throughput proportionally. Thus, applications of the system of the present disclosure should best be used over shorter distances in order to assure maximum data rates.

Description of an Alternate Embodiment

Referring now to FIG. 2, there is illustrated an alternate embodiment of the present disclosure directed to a very high speed data throughput. Very high speed data throughput has greater applicability in video-on-demand and video distribution applications, very fast Internet access, video telephony, and the like. In FIG. 2, a building 80 contains at least one network device to be connected via twisted-pair wire 84 to Local Interconnect Company 70 through demarcation point 82, thence via a short run of outside plant wiring 76, through a broadband multidrop local network interface 86, and finally through an outside plant optical fiber or coaxial cable 74. Devices that may be used on the network 20 must be compatible with the network interface 400 as will be described hereinbelow in conjunction with FIGS. 4 and 5. Such network devices may include, but are not limited to, computer systems 50 (a) . . . (n), telephone sets 52 (a) . . . (n), digital set top equipment 60, loop-start interface equipment 54, network-ready appliances 58, and security systems 64. Although not shown, other network devices such as television sets, high fidelity audio equipment, DVD or VCR devices, security cameras, utility metering equipment, facsimile machines, etc. each having a built-in network interface 400 may also be connected to the network 20. As described hereinabove, the local interconnect company 70 distributes packetized IP traffic between various service providers and the user site.

By placing the broadband multidrop local network interface 86 (also referred to herein as a multi-drop interface 86 or transceiver 86) according to the present disclosure in a curbside or neighborhood area cabinet 88 as shown in FIG. 2, the distance between this interface and each network device within or around the user site may be kept very short. Short distances, on the order of several hundred to a thousand feet, e.g., 100 to 300 meters, can enable the technology of the present disclosure to operate at data rates well above 100 Mbps. Even shorter distances, by locating the broadband multidrop local network interface 86 at a demarcation point 82 of a building 80, enable operation of the technology of the present disclosure at proportionally higher data rates.

The embodiments of the external media shown in FIGS. 1 and 2, between the local interconnect company 70 (alternatively, interconnect service provider) and the demarcation point 82, are two examples of the kind of external network facilities to which the broadband multidrop local network of the present disclosure may be connected. As shown, the broadband multidrop local network is readily adaptable, both as to the physical interface and the performance interface, to high speed systems accessible via various forms of twisted pair, coax cable or fiber optic line, for example, depending on the interface embodied in the network transceivers associated with or contained within the addressable network devices coupled to the network.

Figure 3A:
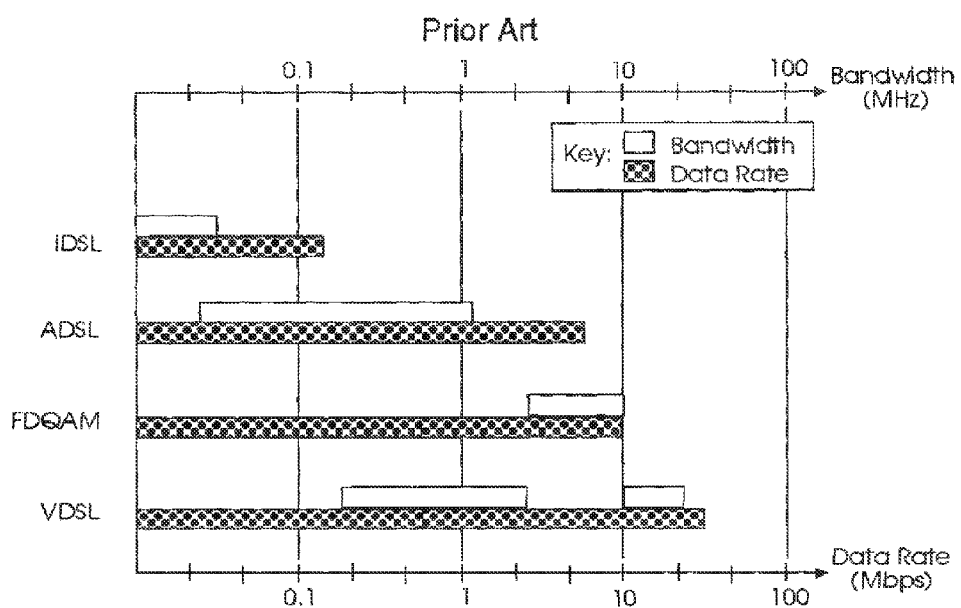
FIG. 3a is a graph illustrating the data rate and bandwidth utilization of prior art technologies.
Figure 3B:
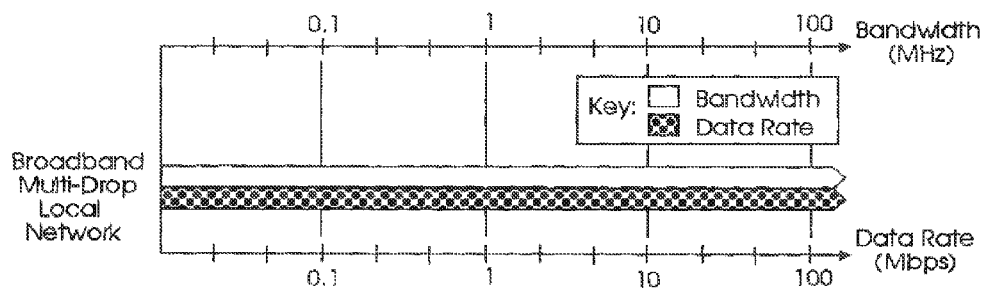
FIG. 3b is a graph illustrating the data rate and bandwidth utilization of the broadband multi-drop network technology of the present disclosure.

To attain such high data rates, digitally modulated analog signals are utilized as applied over a very wide frequency range and operated over a comparatively short distance on an exemplary copper wire medium. Under these conditions, the broadband multidrop local network architecture of the present disclosure provides improved capability over existing technologies. A comparison of the maximum data rate and the bandwidth used by existing technologies and the broadband multidrop local network architecture of the present disclosure is illustrated in the bar charts of FIGS. 3a and 3b respectively. In FIGS. 3a and 3b, data rate range in Megabits per second (Mbps) (shaded bar) is shown next to bandwidth available in Megahertz (MHz) relative to equivalent scales at the bottom and top horizontal axes, respectively, enabling a comparison of bandwidth among the various technologies as well as maximum bandwidth utilization.

Referring specifically to FIG. 3a, there is illustrated the relative bandwidth and data rate performance criteria of four conventional DSL network architectures in the prior art. In the upper graph of FIG. 3a, IDSL (Integrated services digital network Digital Subscriber Line) is shown as requiring approximately 40 kHz of bandwidth and provides a combined data rate of 144 kbps (thousand or kilobits per second) for two B channels (64 kbps each) plus one D channel (16 kbps). For typical data applications, the two B channels are used to create a 128 kbps channel. IDSL is a relatively low speed technology and is used in point-to-point applications. IDSL can provide satisfactory point-to-point operation over a range of several miles.

ADSL (Asymmetric Digital Subscriber Line) technology operates over a band from 25 kHz to 1.1 MHz. ADSL is designed for point-to-point applications and provides a maximum download data rate of 8 Mbps and a maximum upload data rate of 640 kbps. ADSL technology is designed to operate over a range of up to 18,000 feet. Typical download data rates vary with the length of the outside plant wiring used and range from 384 kbps at 18,000 feet up to 8 Mbps for distances shorter than around 12,000 feet. Upload data rates can also vary with distance.

FDQAM (Frequency Diverse Quadrature Amplitude Modulation) was developed by an organization referred to as the HomePNA (Home Phoneline Networking Alliance). FDQAM as implemented by the HomePNA enables data rates of up to 10 Mbps within a building over a distance of up to 500 feet and functionality at distances of up to 1000 feet. The technology developed by the HomePNA is designed for multidrop applications within a building. However, the HomePNA technology is not designed for direct connection to a service provider network as are IDSL, ADSL, VDSL, and the broadband multidrop network technology of the present disclosure. The bandwidth used by the HomePNA FDQAM technology is 6 MHz, extending from 4 MHz to 10 MHz. The comparatively low bandwidth and the lack of dynamic power output control in HomePNA transmitters impede the ability of the HomePNA technology to operate at either very high data rates or over extended distances when compared to the broadband multidrop technology of the present disclosure.

VDSL (Very high-data-rate Digital Subscriber Line) technology operates over a range of 200 kHz to 30 MHz except within the range from 4 MHz to 10 MHz. The 4 MHz to 10 MHz break is to enable simultaneous operation with Home-PNA technology. The approximate 24 MHz bandwidth and high power transmitters employed enable download data rates of 51.84 Mbps with upload data rates of 6.48 Mbps over wire lengths up to 1000 feet. Present modulation technologies used for VDSL are typically implemented with CAP16 (Carrierless Amplitude Phase) modulation.

Referring now to FIG. 3b, the broadband multidrop local network technology described in the present disclosure is not as limited in bandwidth or amplitude as the previously described technologies, thus enabling operation at much higher data rates over comparatively short distances in applications such as illustrated in FIG. 2. In FIG. 3b, the bandwidth and the maximum data rate both extend continuously from very low values to well above 100 MHz/100 Mbps, reflecting the full spectrum capability of the broadband multidrop local network described herein. In contrast, the conventional, point-to-point technologies such as IDSL, ADSL, HomePNA FDQAM, and VDSL shown in FIG. 3a are all specifically limited in bandwidth and amplitude in order to reduce interference in common cable bundles. Additional restrictions are placed on the bandwidth and operating bands of HomePNA FDQAM, ADSL, and VDSL technologies to enable compatibility between each respective technology and other technologies operating simultaneously on the same line. For example, the ADSL and HomePNA FDQAM have range limitations to enable simultaneous operation over the same telephone line. HomePNA FDQAM operates in a frequency range above that of ADSL in order to avoid interference between the two technologies. In another example, ADSL may be used to distribute data point-to-point from the service provider to a building and the HomePNA technology is used to distribute the data within the building.

Another example is seen in the range limitations of VDSL and HomePNA FDQAM. VDSL has a notch from 4 MHz to 10 MHz enabling operation simultaneously with HomePNA FDQAM. This configuration allows VDSL technology to supply data from the service provider to or from a building via a point-to-point connection; then, the data is distributed within the building using a secondary network based on the HomePNA FDQAM technology.

In the broadband multidrop local network illustration of FIG. 2, persons skilled in the art will appreciate that adjacent wiring bundles (and associated cross talk interference) are not present or needed from a distribution point within curb side or neighborhood area cabinet 88 over copper wiring 76 to, within, and around a single building 80. In such a system, the amplitude and frequency range used for modulating data can be significantly increased over those applied in existing technologies. For example, the maximum transmission level and an upper frequency limit of 30 MHz for VDSL technologies were chosen to keep crosstalk between adjacent wire pairs in cables to an acceptable minimum. By removing the requirement for operation in bundled wiring, the broadband multidrop local networks of the present disclosure can operate at its maximum data rate, bandwidth and signal transmission level constrained only by the physical properties of the network 20 and radiated emissions limitations. (Radiated emissions, as is well known, are established by government organizations such as the FCC of the United States or the CSA of Canada.) Further, modulated RF data signals enable data to be carried further at comparable data rates over a copper medium, than other technologies, without requiring the use of repeaters or the like.

For the example of a single tenant building, a pair of wires is sufficient for carrying very high data rates using equipment that operates according to the teachings of the present disclosure. For multiple tenant dwellings, however, such as apartment complexes and high rises, the data rate of the apparatus disclosed herein may need to be reduced to restrict the bandwidth and control signal levels to keep cross talk within acceptable limits for multiple user networks in close proximity.

Because the technology of the present disclosure is designed to replace existing technologies, compatibility with conventional technologies is not a requirement. The bandwidth that previously required multiple technologies and systems that divided the frequency spectrum among technologies in order to achieve full coverage can be covered by the equipment designed according to the unified technology of the present disclosure. Therefore, the overall data rate can be higher than other DSL technologies, given the same physical wiring constraints. As an example, the total VDSL bandwidth is limited to around 24 MHz, because of the constraints of crosstalk in bundled cable pairs and because of the aforementioned 4 MHz to 10 MHz break or notch to ensure compatibility with HomePNA technology. By utilizing the Broadband multidrop local technology of the present disclosure in place of the combined VDSL and HomePNA FDQAM technologies in multiple tenant dwellings, the full bandwidth extending to 30 MHz is available, as well as the usable bandwidth above 30 MHz, thereby resulting in the potential for a greatly increased overall data rate. Also, removing the need for retransmission by a bridge to or from a secondary network within some building installations can further increase the data rate.

A further aspect of the broadband multidrop local network of the present disclosure is the ability to enable the direct operation of one or more network devices on the network 10 of FIG. 1 or the network 20 of FIG. 2 in conjunction with one another and/or a service provider without requiring a separate secondary network within a building 80. This aspect, plus having a common, low cost interface in each attached network device, enables wide acceptance of the broadband multidrop local network technology disclosed herein.

Description of a Network Interface

Referring to FIG. 4, there is illustrated one application of the broadband multidrop local network technology of the present disclosure showing a broadband multidrop local network interface 86 operating in conjunction with one example of a network device—a compatible telephone set 52. This illustration is merely exemplary and is presented to show the versatility of the technology and its potential for wide-spread use. It should be understood that many other uses of the network technology of the present disclosure are possible as will occur to persons skilled in the art.

In the configuration of FIG. 4, IP-based telephone set 52 is used to place and receive Voice over Internet Protocol (VoIP) calls through a service provider via optical fiber 74, broadband multidrop local network interface 86, and the copper wiring 72 and 84 interconnected at Demarcation 82.

For an outgoing call, handset 512 is taken off-hook and a numeric destination address is dialed on keypad 514. The keypad numeric sequence is collected by microprocessor 502*c* of processing unit 502. The keypad numeric sequence is transferred through keypad interface 510 through the DATA bus to microprocessor 502*c*. Control of the transfer of the numeric sequence is provided by programmable logic device (PLD) 502*b*. Microprocessor 502*c*, in turn, uses the numeric sequence received to address the packets to be transmitted and to establish a connection. Packets are transmitted according to well-known industry standard protocol(s).

Once a connection is established, audio from the microphone of handset 512 is amplified in amplifier stage 508 and converted to a digital format in codec 504. From codec 504, the digitized voice data is collected in DSP 502*a* and converted to a compressed version using a compression standard. Compression standards include, but are not limited to, e.g., the International Telecommunications Union's standards for data communication transmission facilities (ITU-T) such as G.711, G.723.1, G.726, and G.729a. The compressed voice data is then transferred through PLD 502*b* to microprocessor 502*c* for assembly and packetization. Program storage and temporary variable storage for performing operations on voice data are contained in FLASH memory 506*a* and SRAM 506*b* of memory circuitry 506, respectively.

From Microprocessor 502*c* of processing section 502, the voice data packets are coupled to broadband multi-drop transceiver 400. The broadband multidrop local network interface or transceiver 400 then prepares the packets for transmission and correspondingly modulates the signal on an analog carrier or a plurality of carriers which traverse through high pass filter 524 and over the broadband multidrop local network consisting of twisted-pair copper wire links 84 and 72 with an interconnection at demarcation 82. The transmitted signal then reaches broadband multi-drop interface 86 and is selectively passed through high pass filter 530 and to a broadband multidrop local transceiver 401 of the broadband multidrop local network interface 86. The broadband multi-drop transceiver 401 then transfers digital electrical signals to the optical fiber transceiver 520 followed by transmission to the local interconnect company and service provider through optical fiber 74. The use of an optical fiber link 74 and related interface components are exemplary and could alternatively be a coaxial cable link and related interface components, or the like. Data packet transmission continues throughout the duration of the call. In order to increase network efficiency and reduce overall data transmission, the telephone set 52 may implement a triggering software routine in DSP 502*a* that requires transmission of voice data only when words are spoken. In that case, data is not transmitted in the absence of spoken words or other audio occurrences that do not fit the voiced triggering parameters.

For incoming calls, voice data packets arrive at broadband multi-drop interface 86 via optical fiber link 74. Optical transceiver 520 receives the optical signal carrying the voice data and converts it to digital electrical signals. The digital electrical signals are received by transceiver 401 and converted to voice data packets that are modulated on a carrier or carriers that pass through high pass filter 530 and traverse the multi-drop network wiring comprised of twisted-pair copper wire 72 and 84 interconnected by demarcation 82. The modulated carrier signals reach and selectively pass through high pass filter 524 and proceed to transceiver 400 of telephone set 52. Transceiver 400 demodulates the received carrier signals and converts these to voice data packets that are sent to microprocessor 502*c*. Microprocessor 502*c*, in turn, depacketizes the voice data and transfers it to DSP 502*a* through PLD 502*b*. DSP 502*a* of processing section 502 then decompresses the voice data and sends it to codec 504 for conversion to an electrical analog signal. The electrical analog signal progresses to amplifier 508 where its amplitude is set to a level consistent with the requirements of the earpiece or speaker element of handset 512 where the electrical analog signal is converted to an audible signal.

Continuing with FIG. 4, an initial notification data signal to provide an indication of incoming calls is received through optical fiber 74, which is connected to broadband multidrop local network interface 86. Corresponding electrical signals reach optical fiber transceiver 520 where they are converted to electrical signals and sent to transceiver 401. The electrical incoming call notification signals progress from transceiver 401, where they are modulated onto a carrier, traverse through high pass filter 530 and further continue through the twisted-pair copper multi-drop network consisting of wire 72 and 84 interconnected by demarcation 82. The modulated incoming call notification signal then progresses to telephone set 52 and high pass filter 524 before reaching transceiver 400 for demodulation and transfer as data packets to microprocessor 502*c*. Microprocessor 502*c* then converts the data packets to acoustic signals generated by transducer 528 of a sufficient level to notify a user of an incoming call. When the handset is taken off-hook, the voice paths are connected and conversation may commence. During conversations, voice data is transmitted and received as previously described.

It will be readily appreciated by persons skilled in the art that many alternative embodiments of the network device 52 shown in FIG. 4 coupled with a network interface 86 are contemplated and the compatible telephone set 52 is not intended to be limiting. For example, the device 52 of FIG. 4 may be modified by replacing the CODEC 504 and telephone handset 512 respectively with an analog-to-digital converter and any of many possible analog signal sources. Thus, digitized analog signals from any source device may be processed and interfaced to the broadband multidrop local network of the present disclosure.

As an optional feature, DC or low frequency AC power may be coupled to the broadband multidrop local network from a localized source. High power devices such as a repeater, security camera, a microprocessor or DSP enabled telephone set, or the like may thus be powered locally and not limited as in the DC battery available from a typical C.O. switching system. Whether provided locally or off-site, the power levels provided could be much higher than those found in typical telephone systems and additionally may not necessarily be required to comply with existing government body rules, such as those of FCC Rules, Part 68 and the CSA Standard CS-03. The application of localized power within or near a building containing a user site network and the provision of high-level power throughout building communications wiring are new requirements necessitated by the application of processor-based IP-communications equipment at user sites.

Continuing further with FIG. 4, peripheral power supply 522 of broadband multi-drop interface 86 derives power from an external source such as an AC or DC power feed and supplies DC current and voltage via low pass filter (LPF) 532 to the network. From the network the internal power supply 516, in turn, distributes regulated and filtered DC voltage and current to various circuits within the telephone set 52. Further, either of power supply 516 or power supply 522 may be configured with battery backup capability to prevent loss of data on the network.

Operation of a Device with a Network Interface

Referring now to FIG. 5, there is illustrated a block diagram of the broadband multidrop local network transceiver 400 (and 401) according to one embodiment of the present disclosure. Each addressable network device connected to the network includes or is associated with such a transceiver 400 which interfaces with the feed line from the interconnect company at the demarcation point or curbside unit via fiber, cable or wireline. The transceiver 400 may be similar functionally to an Ethernet transceiver but differs in several respects as will be described hereinbelow. Received data signals proceed from a twisted-pair wire or other copper medium to physical interface 422. Physical interface 422 may include a connector for connecting the transceiver 400 to the twisted pair wiring or other medium, a coupling transformer, overvoltage protection components, and may also include coupling capacitors for DC isolation. The physical interface 422 couples the data signals to a broadband multidrop local network modem 418 where the incoming packetized IP data signals may be demodulated. The transceiver 400 operates on packetized IP traffic, converting incoming or local-device-originated communications to the broadband multidrop local network format for local distribution or, vice versa, for outgoing traffic from the broadband multidrop local network devices. Modulation schemes employed may include multiple subcarrier modulation, carrierless amplitude phase (CAP) modulation or discrete multitone (DMT) modulation, or a form of quadrature amplitude modulation (QAM), which are well-known in the art.

Continuing with FIG. 5, data rate control 420, a component of the broadband multidrop local network modem 418, is shown in a typical application to enable automatic data rate control so that the data rate can be reduced to account for line impairments while still achieving a valid data throughput; and (b) to allow for a maximum data rate to be set manually during installation by limiting the bandwidth and transmission power level to account for cases where bundled cable pairs are used.

From the broadband multidrop local network modem 418, data packets are sent to the media access control (MAC) unit 414. The MAC unit may include a data link layer, frame formatting, address assignment, and an error correction unit 416. The data link layer, frame formatting, and address assignment are similar to those used in an Ethernet MAC. While an Ethernet MAC also includes error correction, the strategy employed in error correction unit 416 includes additional elements to account for errors encountered in a broadband multidrop local network that are comparatively negligible in an Ethernet network. Examples of such errors would include data corruption resulting from radio frequency interference, signal reflections, and impulse noise caused by power activation and deactivation in networked devices, such as compatible telephone sets, varying current requirements during power activation and deactivation in signaling transitions and the like. Further, when other compatible, similarly powered devices are used in a broadband multidrop local network, the wiring comprising the network can also carry voltage and current necessary for powering these devices. Impulse noise is caused when these network powered devices increase or decrease the amount of current that is being utilized. The error correction unit 416 is implemented to overcome data errors encountered in a broadband multidrop local network. Error correction unit 416 further incorporates, among other strategies, a Cyclic Redundancy Check (CRC) and a low level retransmission capability to facilitate handling of the data by the IP stack. Data errors in excess of those typically found in Ethernet environments are not handled well by traditional IP stacks. Error handling prior to the IP layer simplifies the overall operation by enabling the use of existing Ethernet standards for the bulk of the IP data manipulation.

Continuing further with FIG. 5, data packets operated on in multimedia access control (MAC) 414 proceed to a carrier sense multiple access/carrier detect (CSMA/CD) unit 410. CSMA/CD unit 410 functions include carrier sense, deferral, and collision detection 412. Collision detection 412 is an important aspect of the network of the present disclosure and helps enable a plurality of user site devices to be connected and communicating on a broadband multidrop local network of the present disclosure. CSMA/CD unit 410, in turn, transmits packet data that it has operated on to the Quality of Service (QoS) layer 406. QoS layer 406 defines performance criteria used for data traffic management to automate the consistent and timely throughput of real-time data packets, such as those involved in the transfer of voice, audio, or video information. The QoS layer 406 includes priority control, latency control, and collision resolution 408. Rapid determination of priority of data packets, control over latency of data packets, and rapid resolution of collisions from devices accessing network 10 of FIG. 1 or network 20 of FIG. 2, are combined to ensure a very high data throughput of both real-time and non real-time data in the broadband multidrop local network of the present disclosure.

More particularly, received packet data operated on in QoS layer 406 is transferred to a computing device, such as microprocessor 402 for interfacing between the network transceiver 400 and the addressable network device. Microprocessor 402 may further provide specialized features for implementation in transceiver 400. Specialized features implemented in microprocessor 402 may include, but are not limited to, ITU-T standard H.323, a protocol for real-time packetized multimedia traffic on IP telephony, data encryption/decryption, packetization/depacketization, security protocol control such as IPsec, and the like. The operating software for microprocessor 402 is stored in memory 404 which may also provide temporary storage for variables or configuration values used by the operating software and buffer storage for data transfers. Microprocessor 402 further transfers data to and from transceiver 400 and attached devices through the data and control interfaces and enables the maintenance of a secure communications link, such as those using IPsec, VPN technologies, or the like. A secure link is especially important when communicating voice, audio, video, or critical data through the Internet, for example.

The operational functions of the network transceiver 400 may be partitioned in various ways as will be apparent to persons skilled in the art. As one example, the functions of media access control (MAC) unit 414, carrier sense multiple access/collision detect (CSMA/CD) unit 410 and quality of service (QoS) layer 406 may be grouped together operationally as a network controller for processing traffic through the network transceiver 400.

Data transfer from transceiver 400 into the network enters through the data and control interfaces of microprocessor 402 and may or may not be packetized. If the data is not packetized, the microprocessor 402 is capable of packetizing it. Further, if required prior to packetizing the data, microprocessor 402 can encrypt or add security enhancements to the data. Next, the packet data is transferred from microprocessor 402 to the QoS layer 406 which encodes priority information into the packet data. This priority information will be used by receiving equipment to establish the priority of received data and to assist in controlling latency of data within the network. A further aspect of the use of the QoS layer 406 is that not only is the QoS performed in response to QoS information incorporated in the data header, but it includes the ability to specify the rated available bandwidth for each attached terminal and device up front, so that the user always knows that the total number of devices or the total bandwidth utilization requirement is also included. Such rating could be provided as a label on the device; thus the user need only add up the ratings for all of the attached devices to determine whether the system capacity is fully utilized. Alternatively, information about required data rates could be stored in a memory location in transceiver 400 to be monitored and displayed to the user on a connected computer system from an addressable location on the network.

Continuing with FIG. 5, the packet data operated on in QoS layer 406 is transferred to CSMA/CD unit 410. The CSMA/CD unit 410 determines whether or not it is safe to transmit the packet data based on information from the collision detection unit 412. Packet data operated on in CSMA/CD unit 410 proceeds to the media access control 414 (MAC) layer. The MAC 414 layer provides frame formatting, address assignment, and error correction 416. Within the MAC 414 layer, error correction unit 416 is employed to encode error correction information into the packet to be transmitted.

Packet data operated on in the media access control (MAC) 414 layer is transferred to the broadband multidrop local network modem 418. This modem 418 modulates the packet data onto a wireline analog radio frequency signal to be transmitted employing a modulation scheme configured to provide packetized IP traffic on the network—in effect, a pseudo spread spectrum technique. Such schemes may include multiple subcarrier modulation, forms of quadrature amplitude modulation (QAM), carrierless amplitude phase (CAP) modulation or discrete multitone (DMT) modulation. The packet data is modulated using bandwidth and level constraints provided by data rate control unit 420. From broadband multi-drop DSL modem 418 the packet data flow proceeds through physical interface 422 and on to the twisted pair wire or other copper medium.

Figure 7:
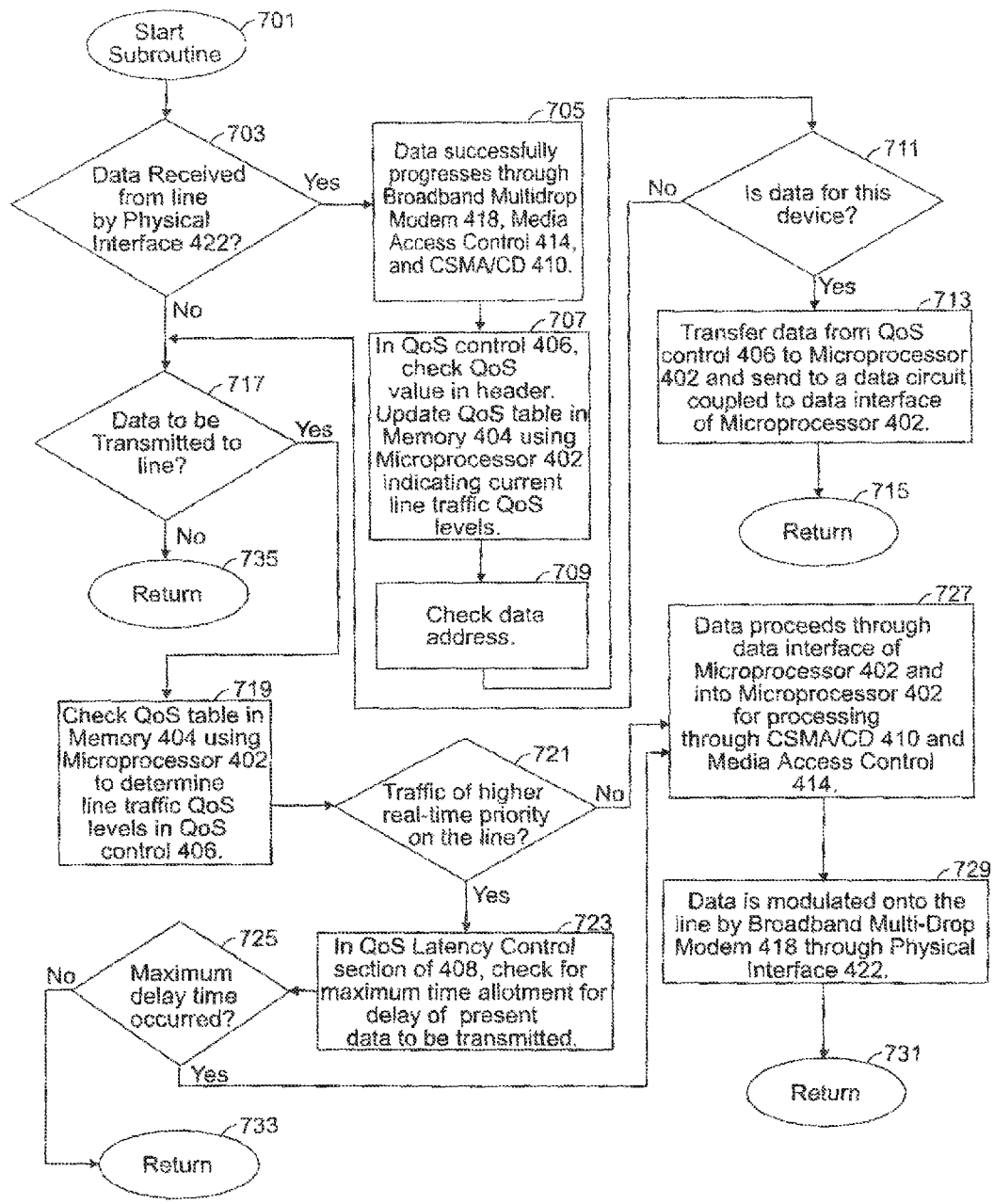
FIG. 7 illustrates a flow chart of one embodiment of the processing provided in the QoS layer of FIG. 5.

Referring now to FIG. 7 there is illustrated one embodiment of the processing provided in the QoS layer 406 of FIG. 5. The subroutine for processing QoS begins at block 701 and advances to a decision block 703 to determine whether or not data has been received from the line by the physical interface 422 of the network transceiver 400 shown in FIG. 5. If data is received, the flow proceeds to block 705 which represents the successful progress of the data through other functional blocks of the transceiver 400, namely, the broadband multi-drop modem 418, media access control 414 and the CSMA/CD block 410. In the next step 707 in QoS layer 406, the processing checks the QoS value in the data header, updates a QoS table (not shown) in memory 404 using microprocessor 402, the QoS value in the QoS table indicating current line traffic QoS levels. Subsequently, in step 709, the data address is checked and, in decision step 711, it is determined whether the data is for this device or another device. If it is for "this" device the flow proceeds to block 713 to transfer data from QoS (control) layer 406 to microprocessor 402 and thence to a data circuit coupled to the data interface of microprocessor 402. After the transfer of the data in step 713, the subroutine returns in step 715.

Continuing with FIG. 7, if either the data is not received from the line by physical interface 422 in step 703 or the data is not for "this" device as determined in step 711, the flow proceeds to decision step 717 to determine whether the data is to be transmitted to the line. If not, the subroutine returns at a Return block 735; but if the data is to be transmitted to the line, the flow proceeds to block 719 to check the QoS table in memory 404, using microprocessor 402 to determine line traffic QoS levels in QoS (control) layer 406. Then, in decision step 721, a determination is made whether traffic of higher real-time priority is on the line and, if not, the data proceeds in step 727 through the data interface of microprocessor 402 and into the microprocessor 402 for processing through CSMA/CD 410 and media access control 414. Following the processing in media access control 414, the data in step 729 is modulated onto the line by broadband multi-drop modem 418 though the physical interface 422 after which the subroutine returns, in step 731. If, in step 721, traffic of higher real-time priority is on the line, then the flow proceeds along the "Yes" path to step 723 to check for the maximum time allotment for delay of the present data to be transmitted, the check being performed in the QoS latency control section 408. Next, the system determines whether the maximum delay time has occurred and, if so, the data is processed in accordance with step 727; otherwise the process flow returns via step 733.

Figure 8:
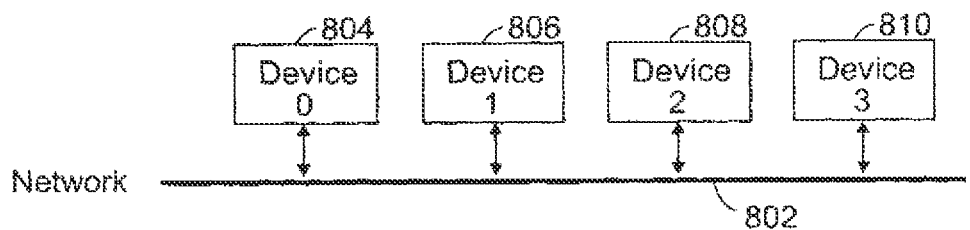
FIG. 8 illustrates a diagrammatic view of a simplified multidrop network.

FIG. 8 illustrates an exemplary simplified diagram of the network described hereinabove. In the embodiment of FIG. 8, a network mesh 802 is illustrated that provides the communication path for all packets generated by any node on the network. There are illustrated four devices, network device 804, network device 806, network device 808 and network device 810 labeled Device 0, Device 1, Device 2 and Device 3, respectively. Each of these devices 804 through 810 is operable to generate packets of data that are placed onto the network mesh 802. These packets have a protocol that is recognized by all other network devices, it being understood that only one data packet can be transmitted onto the network mesh 802 at any one time. Any type of protocol can be utilized. Therefore, each of the network devices 804 through 810 must have some type of collision avoidance associated therewith, i.e., when one network device has access to the network mesh 802, the other network devices do not transmit data packets to the network mesh 802. Of course, transmission of data packets onto the network mesh 802 by multiple devices in an orderly manner is conventional. However, in most data transmission environments, data is transmitted to the network mesh 802 on an "available" basis, i.e., if multiple devices exist on the network mesh 802, then the rate at which a given network device can transmit packets is reduced in that all transmitting devices are sharing the bandwidth of the network mesh 802. This results in a slower data throughput for any given device. This is basically referred to as "high traffic" on any type of network mesh.

As an example, consider a standard Ethernet system that has a defined data rate for the network mesh. A data packet will be assembled by any given network device, which data packet can be transmitted at up to the maximum data rate of the network mesh. However, if there are a large number of devices on the network mesh, then the number of data packets by any one device will be reduced, whereas the total number of data packets on the network mesh by all the devices can be transmitted at the maximum data rate of the bus. If there are real time applications associated with any one of the network devices, then this provides a significant disadvantage to a given network device in that some data will merely be lost. An example of this would be a streaming video application wherein all of the data packets associated with a given frame of video information must be transmitted within a given time. If, for some reason due to traffic, that data will not transmit during the frame, it would merely be lost if received later, as it will be associated with a frame that has already been displayed—hence it will be discarded.

In the present disclosure, each of the network devices 804 through 810 has associated therewith, in one embodiment, a defined portion of the data traffic capabilities of the network mesh 802. For example, if Device 0, network device 804, when operating at its full data rate, required forty percent of the available data traffic capabilities to ensure that all data packets required to be transmitted were in fact transmitted and received, this amount of the data traffic capabilities would be allocated to or reserved for that device. This orientation would be similar for the remaining devices 806 through 810, i.e., each would have a proportionate amount of the data traffic capabilities reserved in accordance with the requirements of each device. This is illustrated in FIG. 9.

Figure 9:
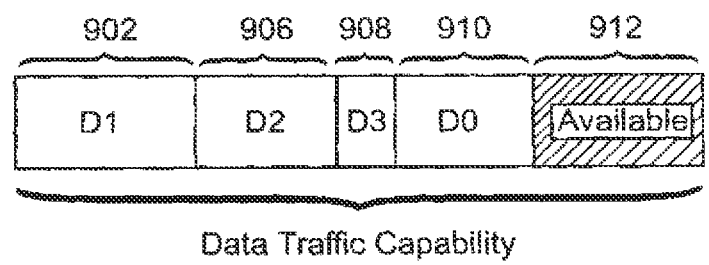
FIGS. 9 and 10 illustrate allocations of data traffic capabilities for the network.

In FIG. 9, there is provided a diagram of the data traffic capability that is associated with the network mesh 802. There is provided a first portion of the data traffic capability 902 that is associated with device 806, labeled "D1." This is the portion that will be provided to the device 806 which has been predetermined to require this amount of the data traffic capability, i.e., it must be able to transmit a certain number of data packets within a certain period of time. A second portion 906 is provided associated with device 808, labeled "D2" with a third portion 908 associated with device 810 labeled "D3" and a fourth portion 910 labeled "D0" associated with the device 804. In this example, the portions 902, 906, 908 and 910 do not utilize the entire data traffic capability. There is a section 912 that provides an additional available portion that can be occupied by another device. However, each of the devices 804 through 810 is guaranteed a reserved portion of the data traffic capability. If another device were added to this system that required, during operation thereof, a portion of the data traffic capability on the mesh 802 that exceeded the portion 912, that being the remaining unreserved portion 912, it would be denied access to the network mesh 802. This would be the case in this embodiment even though none of the devices 804 through 810 were actually operating on the network mesh 802. Even though no data packets are being transmitted, it is the reservation of the data traffic capability that defines whether a device can have access to the mesh 802 and constitute an available device on the network. This embodiment will be expanded upon hereinbelow with various priority levels. However, in this embodiment, each device has the same priority level and the existence of other devices has no bearing on the ability of any given device to transmit at its full packet rate on the network mesh 802.

Figure 10:
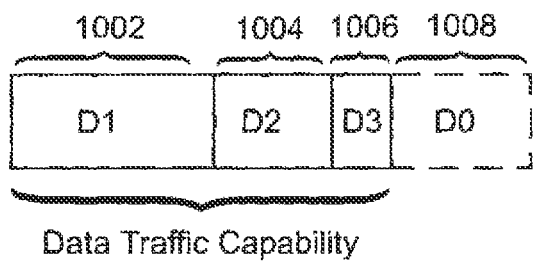

In an alternate embodiment illustrated in FIG. 10, the data traffic capability is divided up into a first portion 1002 associated with the network device 806 labeled "D1," a second portion 1004 is associated with network device 808 labeled "D2," and a third portion 1006 is associated with the network device 810, labeled "D3." The network device 804 labeled "D0" cannot be added to the network, due to the fact that it has a data traffic capability requirement depicted as a Section 1008 that is in excess of the previously reserved data traffic capability, the data traffic capability being totally reserved for use by devices 806 through 810. Again, even if the devices 806 through 810 are all inactive, access is still denied to device 804. As will be described hereinbelow, access can be determined by a user examining the data traffic capability requirements of a given device via a label or the such with knowledge of the devices already existing on the network and knowledge of the total data traffic capability that can be accommodated by the network. In that situation, the user would just refrain from adding a device that would exceed the reserved data traffic capability, thus ensuring that all devices would operate at full packet rate.

Figure 11:
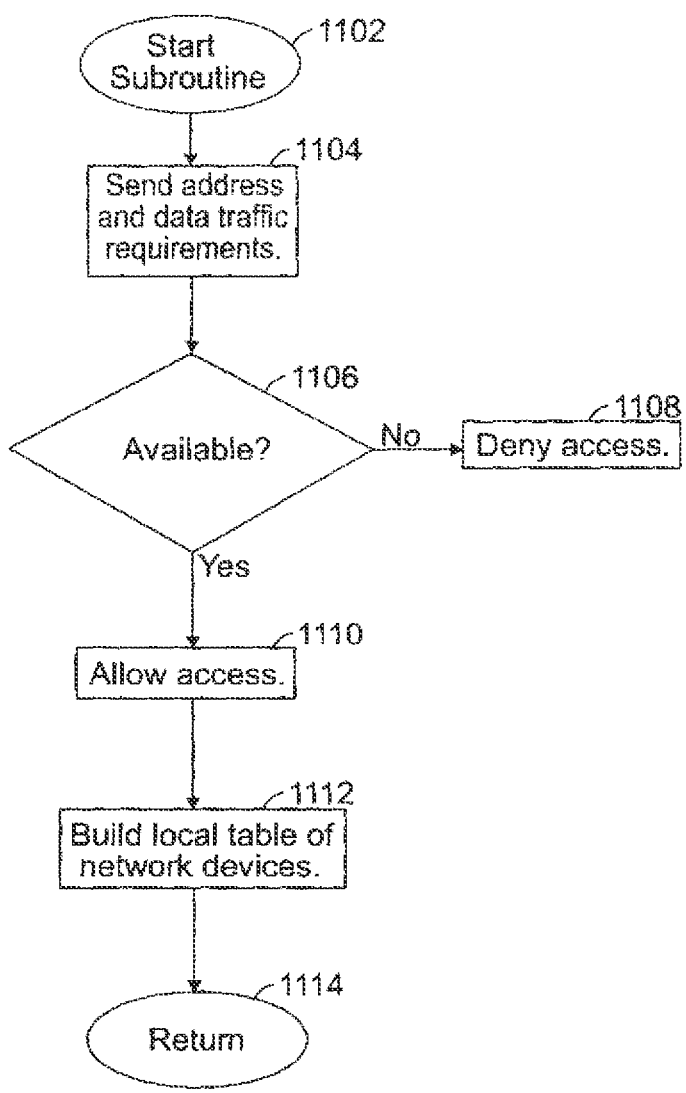
FIGS. 11 and 12 illustrate flowcharts for adding a node to the network.

Referring now to FIG. 11, there is illustrated a flowchart depicting the operation of adding a device to the network, from the network device perspective. This is initiated at a block 1102 and then proceeds to a function block 1104 wherein the address and data traffic requirements are sent to the network from the device. Typically, this will occur with the requesting device transmitting to the network a signal in the form of a data packet indicating its presence on the network as a request for access and/or reserving the required portion of the data traffic capability of the network. This data packet will have the address of the requesting device seeking access to the network, in addition to information about the requesting device, i.e., data traffic requirements, priority levels, etc. There will be at least one device on the network that will recognize this as an "I am here" data packet and determine if there is any unreserved data traffic capability on the network to allow access. This decision will be made at a decision block 1106. If there is no available unreserved data traffic capability, a data packet will be sent back to the requesting device to deny access, as indicated by flow along a "No" path to a block 1108 to deny access. If the data traffic capability is available, the program flows along a "Yes" path to a function block 1110 to allow access and then to a function block 1112 wherein a local table of network devices will be built at the device. This block 1112 is an optional step which allows the newly accessing device to be provided with information as to which devices are presently on the network, this being for the purpose of communicating with those devices. However, it can be that no actual knowledge of devices present on the network is required. For example, if a network IP-based telephone were attached to the network and attempted to contact another network device that was not granted access through its address known from other sources, it would just be provided information that the network device cannot be reached. After access and building of the local table of network devices is complete, the program will flow to a Return block 1114.

Figure 12:
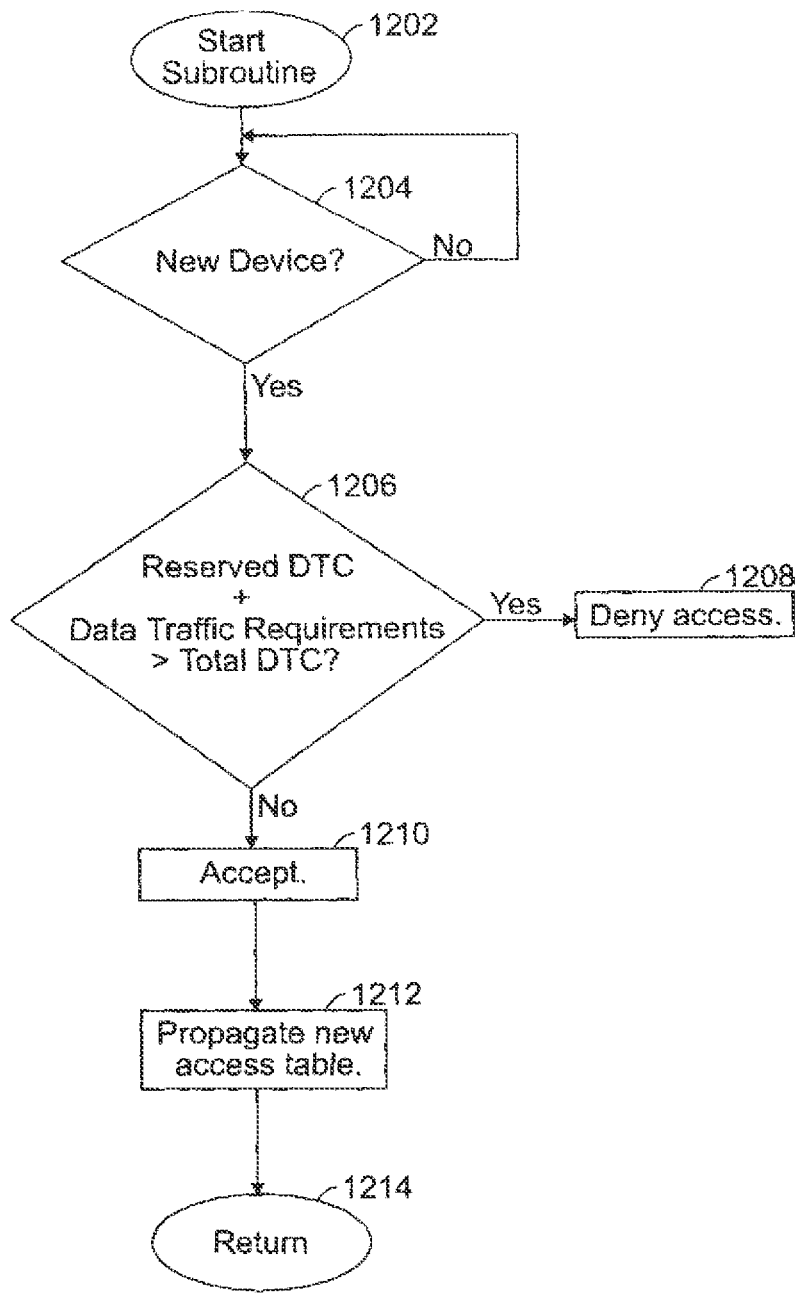

Referring now to FIG. 12, there is illustrated a flowchart depicting the operation of determining availability on the network. The program is initiated at a Start block 1202 and then flows to a decision block 1204. There will be at least one device on the network that will be assigned the task of responding to access inquiries from a new device. If the decision block 1204 determines that a new device is acquiring access, it will flow along the "Yes" path to a decision block 1206 to determine if the total reserved data traffic capability (DTC) plus the DTC required by the new device is greater than the unreserved DTC on the network. If so, the program will flow to a function block 1208 along a "Yes" path to transmit back to the requesting device a data packet indicating that access is denied. However, if excess DTC is available, the program will flow along a "No" path to a function block 1210 to accept the device and transmit a packet to the requesting device indicating that there is unreserved DTC available. Although not illustrated, during a determination of unreserved DTC, the device provided the task of determining unreserved DTC has the ability to actually poll the other devices that are currently indicated as having reserved DTC on the network. If one of these devices has been disconnected from the network, then it will be removed from an internal table that is associated with the access determining device. Once the determination has been made that unreserved DTC is available and the data packet indicating such has been transmitted to the new requesting device, then the table will be updated and this table information can then be propagated to all the other devices on the network, as indicated by a function block 1212. However, it is not necessary that all of the devices be provided this information depending upon the application. It is important that there be some central location that has knowledge of this information and can provide the control over the access to the network. After the table has been updated, the program flows to a Return block 1214.

Figure 13:
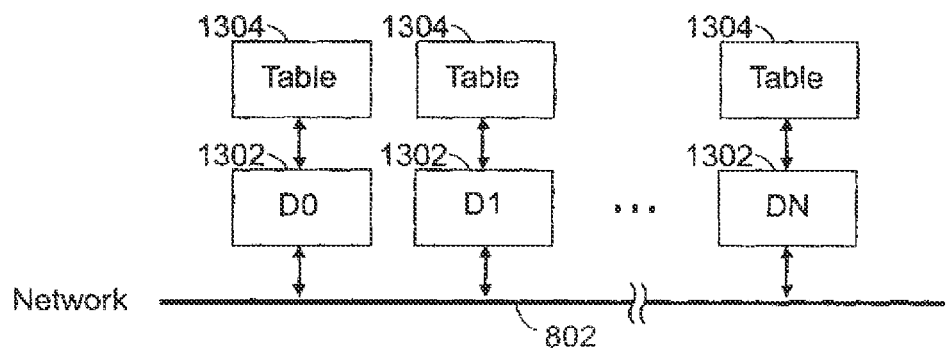
FIG. 13 illustrates a simplified diagram of a network wherein each node has an update table.

Referring now to FIG. 13, there is illustrated a simplified diagram of how the information is distributed over the network. In this illustration, there is shown a plurality of network devices 1302 labeled D0, D1, . . . DN. Each of these network devices 1302 has associated therewith a network access table 1304 which has associated therewith information as to network access. In one embodiment, a priority will be established wherein the first device to access the mesh 802 will be assigned as the access controller. It will continually or periodically poll each of the devices to determine their continued existence on the network. Each of the devices not having the access determination task will exist in a mode that will require polling by the access determination device to have occurred on a periodic basis. If, for some reason, the accessing determining device is removed from the network, then the remaining devices will become aware of this and the next device to have accessed the network mesh 802 after the original access determining device had accessed the network will then take over the task of the access determining device and all of the other devices will have their priorities in that chain altered, such that each of the tables 1304 has contained therein the access priority thereof. However, there are many different ways to assign the task to any given one of the network devices 1302. Further, all that is required is that one of the network devices reply to a new device accessing the network to make a determination as to whether any portion of the DTC is available and whether that portion is sufficient for the requesting device.

Figure 14:
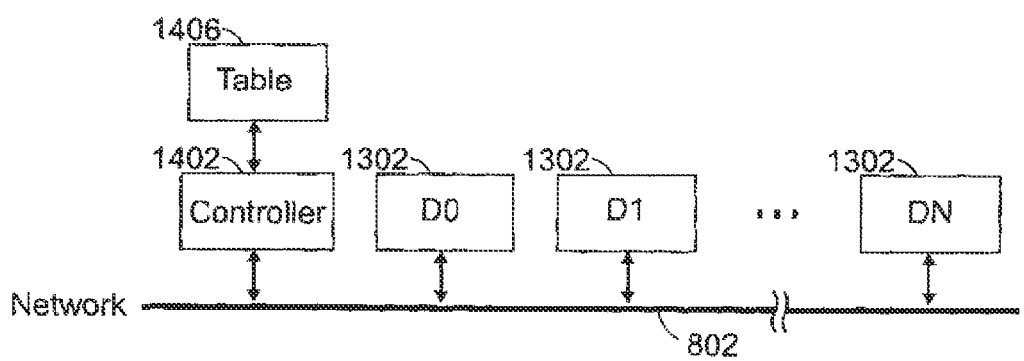
FIG. 14 illustrates a simplified diagram of the network wherein a central controller is provided with the update table.

Referring now to FIG. 14, there is illustrated an alternative embodiment to that of FIG. 13. In this embodiment, there are no tables provided in association with each of the network devices 1302. Rather, there is provided a controller 1402 on the network that has associated therewith a table 1406. This table 1406 contains all of the network information as to which devices are on the network mesh and makes all determination as to network accessibility, i.e., the controller 1402 has knowledge of the reserved bandwidth for all devices and knowledge of each device's data traffic requirements. It can determine, when receiving a request from a device to gain access to the network, whether there is any unreserved bandwidth.

Figure 15:
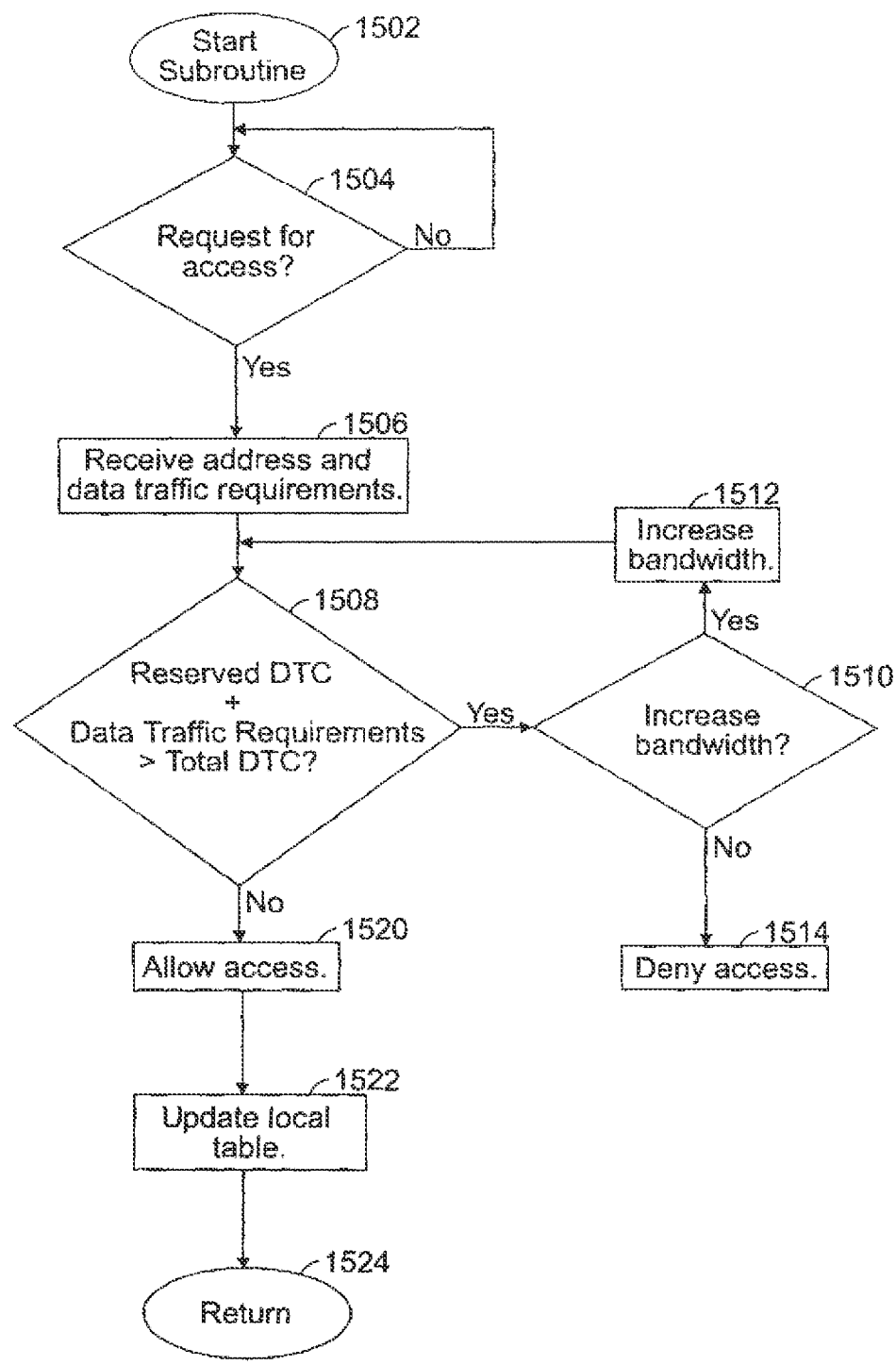
FIGS. 15 and 16 illustrate flowcharts for accessing the network.

Referring now to FIG. 15, there is illustrated a flowchart depicting an alternate embodiment of the operation of handling a request for access. This is initiated at a Start block 1502 and then proceeds to a decision block 1504 to determine if a device is requesting access. If so, the program flows to function block 1506 to receive both address and bandwidth requirements as described hereinabove. Determination is then made at a decision block 1508 as to whether the additional data traffic requirements for the new device will exceed the available unreserved bandwidth. In this embodiment, if the unreserved bandwidth has been exceeded, the program will flow along a "Yes" path to decision block 1510 to determine if the data traffic capability (DTC) can be increased. This is a mode wherein an Internet Provider can be contacted by the system to increase the bandwidth of the network. If so, the program will flow along a "Yes" path to a function block 1512 and then return back to the input of decision block 1508. However, if bandwidth cannot be increased, the program will flow along a "No" path to a function block 1514 to deny access. In this mode, where bandwidth can be increased, it is possible that the bandwidth availability is a function is cost. It may be that a new application associated with the new device has data traffic requirements well in excess of that available. As such, there can be a provision available to the user that will allow the bandwidth to be increased when a new service provision is implemented, i.e., a device with a higher data traffic requirement is added to the system. This could be automatic wherein a controller would request from a central system, i.e., in Internet Provider, additional bandwidth. This could be then reflected in the billing information for the user. Of course, this bandwidth could actually be temporary and could be lowered at a later time when the device was removed. Additionally, the devices on the network must be able to increase their data rate so as to decrease the time duration of a packet.

When it has been determined that the device can be added due to the availability of data traffic, the program will flow as noted hereinabove, to a function block 1520 to allow access and then to a function block 1522 wherein a table will be updated with the devices that have been granted access and the data traffic requirements therefor. The program then flows to an End block 1524.

Figure 16:
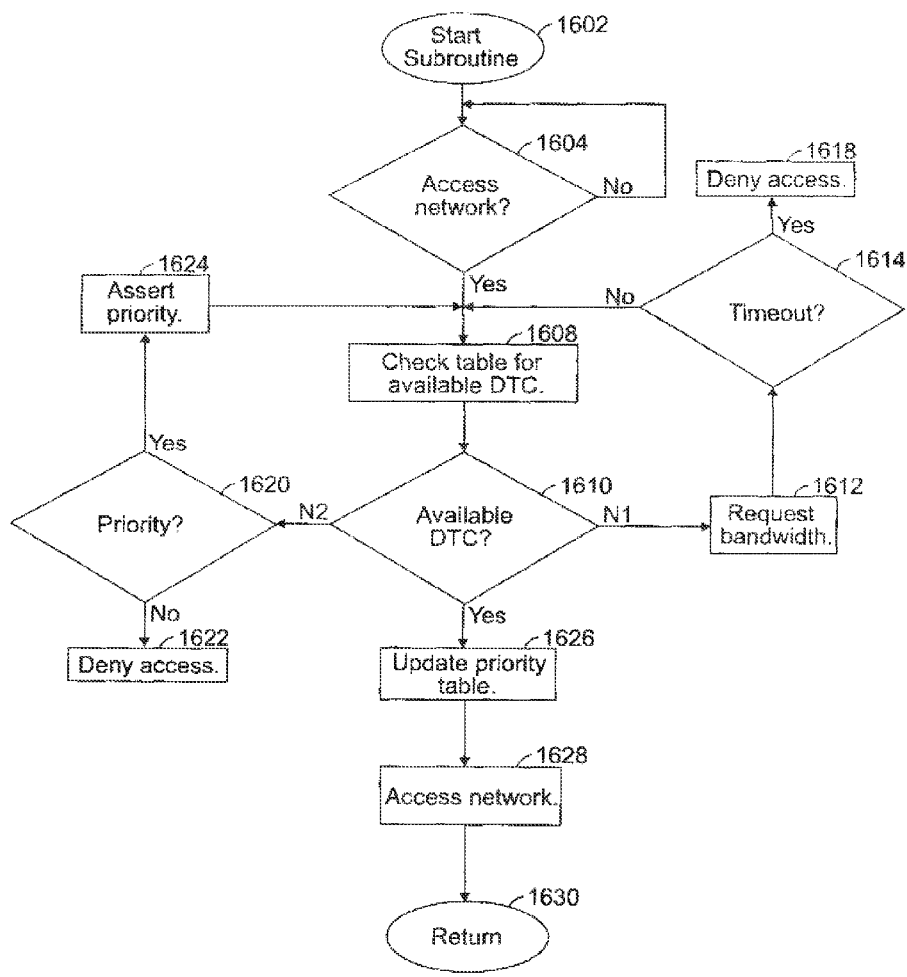

Referring now to FIG. 16, there is illustrated a flowchart depicting an alternate embodiment for granting access to the network. This program is initiated at a function block 1602 and then proceeds to a decision block 1604 to determine if a device is attempting to access a network. If so, the program flows along a "Yes" path to a function block 1608 to check the table for available data traffic capability (DTC) and then to a decision block 1610 to determine the available DTC, as described hereinabove. There are two different embodiments illustrated for the condition wherein the currently available DTC is less than is required for the addition of a new device. In the first embodiment, the program will flow along an "N1" path to a function block 1612 to request additional bandwidth. This is similar to the embodiment of FIG. 15. The program merely requests the bandwidth and then waits for the bandwidth to be increased. This program will flow along a path to a timeout block 1614 which will allow flow of the program to return to the input to function block 1608. This will continue until the bandwidth has been provided or, if a certain time has elapsed, the program will flow from the timeout block 1614 to a function block 1618 to deny access, as described hereinabove. In an alternate embodiment, the lack of available DTC will result in the program flowing along an "N2" path to a decision block 1620 to determine priority. In this embodiment, each device is provided a priority based upon the class of service, i.e., real time applications such as video streaming will have higher priority than a telephone, for example. The access table will be checked for priority to determine if there is a lower priority network device on the system. If not, the program will flow along the "No" path to a function block 1622 wherein access will be denied until devices with higher priority are not accessing the mesh. However, if it is determined that the currently requesting device is a higher priority than another device on the system, the program will flow along a "Yes" path to a function block 1624 wherein priority will be asserted, and then back to the input of function block 1608. When priority is asserted, the network device that determines access will send a request to the lower priority device that is to be disconnected in that it no longer has access to the network and it will be removed. The program will then flow from the block 1610 where it has now been determined that unreserved DTC is available and the requesting device can be added, to a function block 1626 to update the priority access table with both access information and priority information. The program will then flow to a function block 1628 to allow access to the network and then to a Return block 1630.

Figure 17:
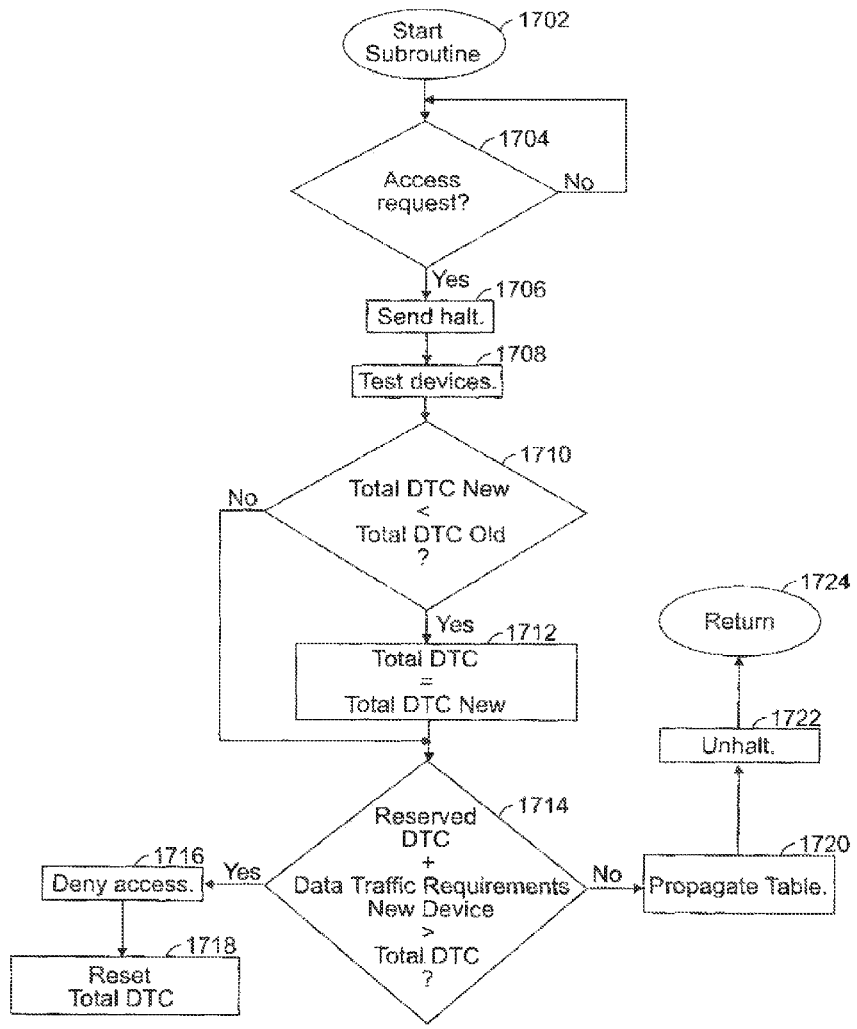
FIG. 17 illustrates a flowchart for adding a device to the network.

Referring now to FIG. 17, there is illustrated a flowchart depicting the operation of adding a device to the network. As noted hereinabove, when an additional device requires access to the network, it must be able to reserve a portion of the available data transfer capabilities of the network. Either there is a sufficient amount of data transfer capability that is unreserved and which is equal to or less than that required by the requesting device, or the requesting device has a priority that exceeds that of one of the already attached network devices, and that network device will be taken off of the network to provide room for the requesting device.

The flowchart is initiated at a Start block 1702 and then proceeds to a decision block 1704 to determine if an access request is received. In one aspect of the present disclosed embodiment, any requesting device will transmit to the network a request that will be recognized by one or more of the devices already attached to the network. Once this device is recognized, the program flows along the "Yes" path to a function block 1706 to halt all transmission on the network from all of the attached devices. ("Attached" in this context indicates those devices that have been allowed access to the network and not the actual "physical" attachment, as a device may be physically attached, but not allowed access and, therefore, not "attached.") The program then proceeds to a function block 1708 in order to test all devices on the network to ensure that the new device can fit within the unreserved data transfer capabilities of the network at the rated data transfer rate associated with the network. If the data rate for the device to be added alters the overall date rate of the network as to the requirement for the presently attached network devices, due to the potential addition of the new network device, this will then change the data transfer capability of the network. For example, if a slower device is added to the network, then it is possible that some of the currently attached network devices will be required to transmit at a slower data rate. Therefore, at a decision block 1710, a determination will be made as whether the data transfer rate has increased or decreased and whether the data transfer capability (DTC) of the network has specifically increased or decreased. If so, then the program will flow along the "Yes" path from decision block 1710 to a function block 1712 to set the total DTC to the newly determined total DTC. The reserved portion thereof will also have to be recalculated. If not, the program will flow along the "No" path from decision block 1710 to a decision block 1714. Decision block 1714 determines whether the reserved DTC plus the data traffic requirements of the new device will be greater than that of the total DTC of the total network. If yes, then the new device will be denied access, at a function block 1716, and then the data transfer rate or unreserved DTC will be reset to the original DTC value, as indicated by a function block 1718. However, if the new device does not exceed the unreserved data transfer capability, then the program will flow to a function block 1720 to propagate a new table to all the other devices and then to a function block 1722 wherein the network will be "unhalted" to allow communication over the bus by all of the attached network devices. The program then flows to a Return block 1724.

Figure 18:
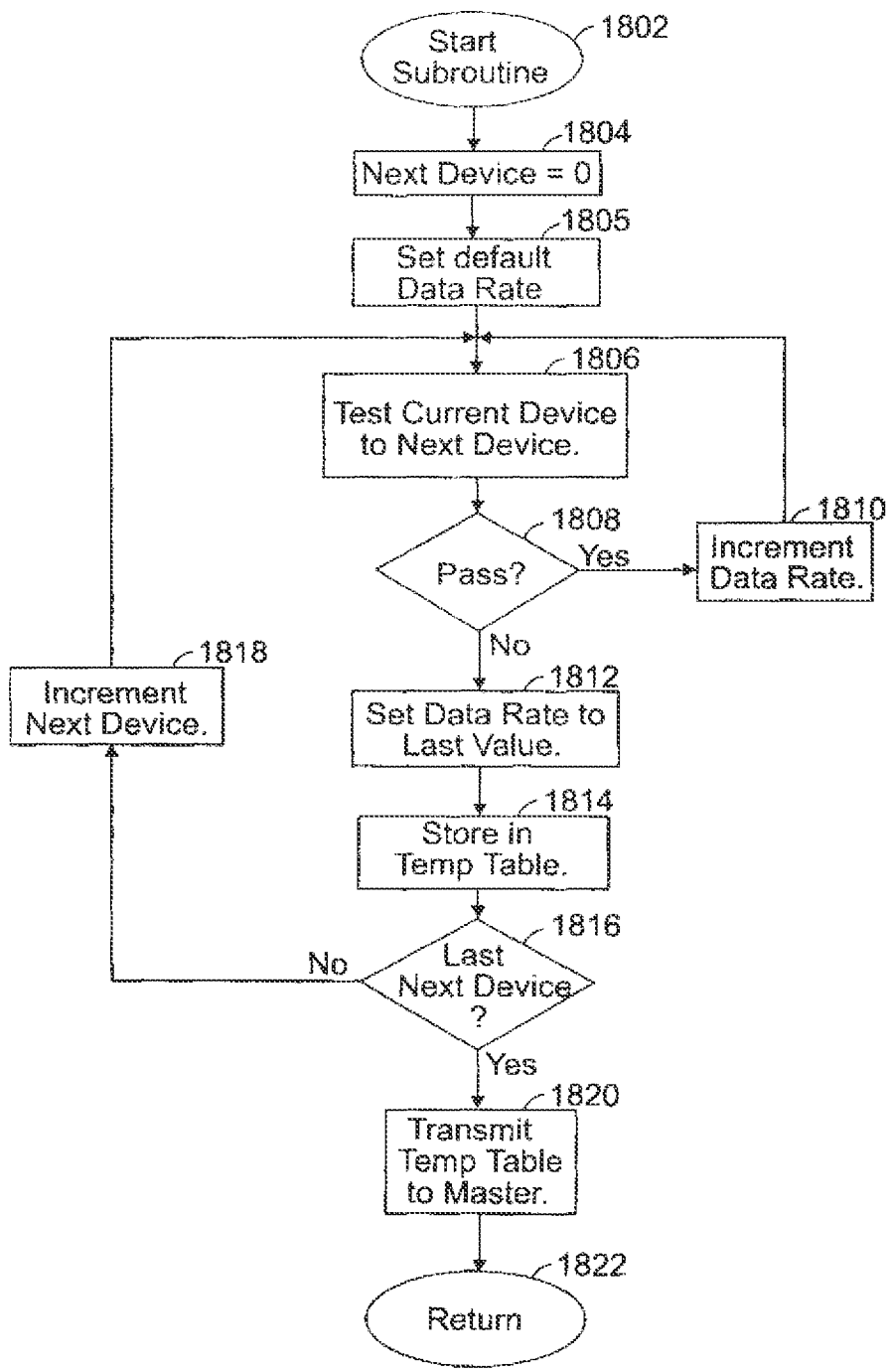
FIG. 18 illustrates a flowchart for determining data rate between devices.

Referring now to FIG. 18, there is illustrated a flowchart for the test operation. In the test operation, each device determines the data rate that can be transmitted to each other device in the network. It may be that, for example, device A on the network can transmit to device B at one data rate, but device B can only transmit at a lower data rate to device C, and device A can transmit to device C at even a different data rate. The lowest data rate between devices must be the data rate that is set for the overall network in the disclosed embodiment. (However, it is noted that devices of differing data rates could be accommodated on the network, as long as the data transfer capabilities of the network can be determined to accommodate these different data rate devices.) Therefore, each device must test its ability to transfer data at a particular transfer rate to all other devices on the network to which it could potentially transfer data such that an accurate determination of the total data transfer capabilities of the network at that data rate can be made and then a determination as to whether all of the currently attached network devices plus the addition of the new device can be accommodated. For example, if a new device were to be added to the network and it had a lower data rate than associated with a present configuration, it may be that the network operating at that lower data rate would have the data transfer capabilities changed such that it would not even accommodate the currently attached devices in the present configuration, even without the addition of the new device.

The program is initiated at a block 1802 and then proceeds to a function block 1804 to set the value of Next Device to the value of "0," and then to a function block 1805 to set the data rate at the default data rate, i.e., typically the lowest data rate The program then flows to a function block 1806 to test the transfer data rate from the Current Device to the Next Device with selected data rate. The program then flows to a decision block 1808 to test the transfer capabilities between devices at this data rate. If it passes, this indicates that data packets can be transferred at this data rate and the data rate will be incremented, as indicated by function block 1810 along the "Yes" path, which flows back to the input of function block 1806 to again test the data transfer rate at this incremented data rate. When it is determined that the data transfer rate is too high, the program will flow along the "No" path to a function block 1812 to set the data rate to the last value prior to the failure. The program then flows to a function block 1814 to store this value in a temporary table and then to a decision block 1816.

At decision block 1816, a determination is made as to whether all the devices have been tested which are attached to the network and which can be communicated with by the current device. If the current test cycle is that associated with the last device, the program will flow along the "No" path to increment the value of Next Device at a function block 1818 then the program flows to the input of function block 1806 to again test the Current Device transfer rate to this Next Device. When all the devices have been tested, the program will flow along the "Yes" path of decision block 1816 to a function block 1820 to transmit the temporary table for this device to the master. Of course, the current device may actually be the master and this will just require a transfer from one location in memory to another. The program will then flow to a Return block 1822.

Figure 19:
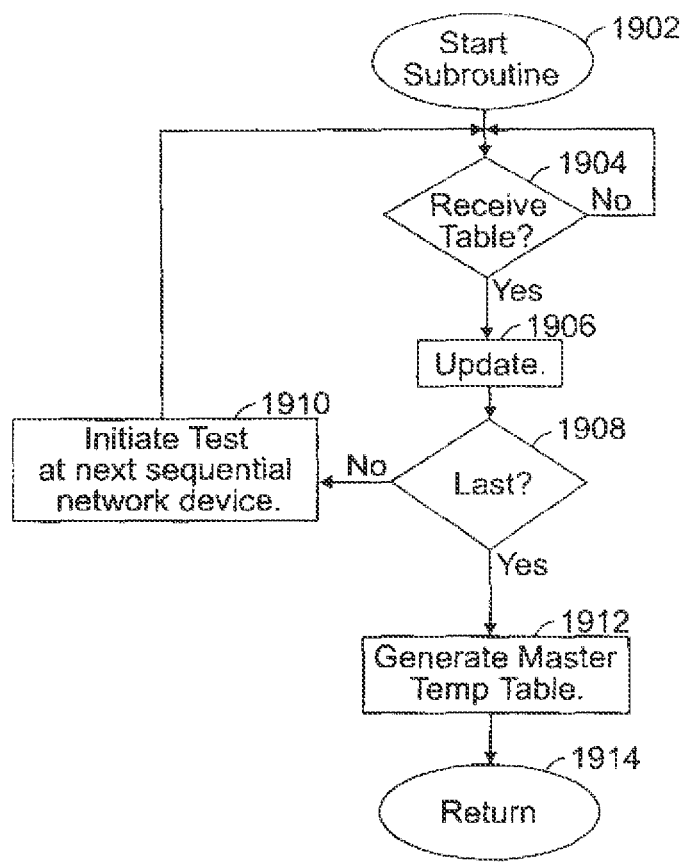
FIG. 19 illustrates a flowchart depicting the operation of controlling the devices at which the data rate test is performed.

Referring now to FIG. 19, there is illustrated a flowchart for the master control operation of the testing of the devices. The program is initiated at a block 1902 and then proceeds to a decision block 1904 to determine if the updated table has been received from a unit that is being tested. If so, the program will flow along a "Yes" path to a function block 1906 wherein the table will be updated. The program then flows to function block 1908 to determine if the last device has performed its network test, it being noted that each device on the network is required to test its capability of communicating with other devices. If not, the program will flow along an "No" path to a function block 1910 to initiate the test at the next sequential network device and then flows back to the input of decision block 1904 to await receipt of the table after that next sequential network device completes its test. Once the last device has completed its test, the program will flow from the decision block 1908 along the "Yes" path thereof to a function block 1912 to generate a master table which is a table that will then be converted to the master table if it has been determined that addition of a new device will not exceed the total data rate transfer capabilities and then this master table will be propagated, as indicated hereinabove in FIG. 17 with respect to function block 1720. The program will then flow to a Return block 1914.

Summary

To summarize, there has been disclosed a broadband multidrop local network architecture for use in intercoupling multimedia traffic to and from a wide variety of addressable network devices. Each network device may be coupled via a network interface or broadband transceiver to a single wireline coupled to an external broadband communication service. Such communication service may be provided, e.g., via fiber optic link to a curbside terminal by an interconnection company, without requiring a complete secondary network and the associated equipment such as modems, routers, converters, hubs, switches, etc. The full data traffic capability at the full bandwidth achievable with relatively short runs (e.g., on the order of 100 meters) of twisted pair copper wire may be utilized when all traffic for all of the participating network devices is packetized on a wired medium for distribution thereon without the bandwidth, point-to-point, or data rate restrictions associated with conventional individual DSL (digital subscriber line) or similar services. In effect, the useable spectrum that exists on the broadband multidrop local network as disclosed hereinabove is a closed spectrum; that is, the entire bandwidth technically feasible on a twisted-pair medium over these relatively short distances is dedicated to the broadband communication capability implemented in each local network such that total data rates, with present standards and technologies, of at least 100 Mbps, and beyond to over 500 Mbps at reasonable distances, are available for each local network transferring data packets at the maximum packet rate of all network devices attachable thereto even when all of the network devices are transmitting. Each network device (computers, peripherals, telecommunications equipment, security systems, broadcast audio and video, to name just a few) may be assigned a bandwidth or packet data rate rating such that its use on the network appropriates a required portion of the total available data traffic capabilities of the network when in use and the user knows immediately what portion of his/her network capacity is being utilized.

Other Embodiments

Although the broadband multidrop local network technology of the present disclosure has been described in detail with respect to specific embodiments thereof, it should be understood that various changes, substitutions and alterations can be made therein without departing from the spirit and scope of the invention as defined by the appended claims. For example, any modulation scheme besides the multiple subcarrier modulation scheme described hereinabove may be used in the various embodiments of the present disclosure to provide the broadband packetized IP data on the wired bus. Further, it is contemplated that in some applications wireless interfaces via hubs or bridges or other network equipment may be connected or otherwise coupled to the wired bus to provide enhanced versatility. For example, a user's PC could be coupled to the wired local network of the present disclosure yet be moved around as the user need warrants.

What is claimed is:

1. A method for communication over a multidrop local network that includes a network mesh for receiving a plurality of multidrop network devices and the network having an operating bandwidth that determines the maximum rate of packet transfer between devices disposed on the network, comprising the steps of:
   disposing a plurality of multidrop network devices on the network;
   defining the operating data rate for each of the multidrop local network devices on the network and the bandwidth required for the operation of each of the network devices such that the required number of data packets per unit time can be received thereby;
   allocating with a network controller on the multidrop local network a portion of the available bandwidth to each of the multidrop network devices as reserved bandwidth, wherein the step of allocating with the network controller comprises:
   providing a central controller interfaced with the multidrop local network, and
   allocating with the central controller the available bandwidth ; and
   denying access to an added multidrop network device when the required bandwidth thereby exceeds the reserved bandwidth.

2. The method of claim 1, wherein the step of defining comprises the step of manually setting the data rate of at least one of the multidrop network devices.

3. The method of claim 1, wherein the step of defining comprises the step of adjusting the data rate of at least one of the multidrop network devices to the data rate of another of the multidrop network devices.

4. The method of claim 1, wherein the step of defining comprises the steps of:
   each of the multidrop network devices communicating with each of the other of the multidrop network devices and determining the maximum data rate for communication therewith; and
   setting the maximum data rate of the multidrop local network to the lowest data rate determined by any one of the multidrop network devices that is required to communicate with all of the rest of the multidrop network devices.

5. The method of claim 1, wherein at least one of the multidrop network devices has the capability to alter its bandwidth and transmit/receive more or less packets of data to/from the multidrop local network and at least one of the other of the multidrop network devices has the capability of requesting a higher or lower bandwidth from the at least one of the multidrop network devices and further comprising the steps of:
  sending a request for a change in bandwidth from the other of the multidrop network devices to the at least one of the multidrop network devices to alter its bandwidth;
  receiving by the at least one of the multidrop network devices the request for an alteration in bandwidth;
  the at least one of the multidrop network devices altering its bandwidth; and
  reallocating with the network controller the reserved amount of local network bandwidth for all or select ones of the multidrop network devices to accommodate the alteration in the bandwidth of the at least one of the multidrop network devices.

6. The method of claim 5, wherein the at least one of the multidrop devices is capable of interfacing with an external data provider that can change the data transfer rate therefrom to and from the multidrop local network and operates to interface between one or more of the multidrop network devices and the external data provider to allow data packets to be transferred therebetween.

7. The method of claim 6, wherein the network controller resides at a remote location and is accessible via the external data provider.

8. The method of claim 1, wherein each at least two of the multidrop network devices include network controller capability and further comprising assigning to one of the at least two of the at least two multidrop network devices the role of the network controller.

9. The method of claim 1, wherein at least one of the multidrop network devices has a user interface with a predetermined functionality that can be changed as a function of the bandwidth allocated thereto in the step of allocating and wherein the step of defining comprises the step of adjusting the data rate of the at least one of the multidrop network devices to the data rate of another of the multidrop network devices and changing the function of the user interface in accordance with the data rate.

10. The method of claim 1, and further comprising the steps of:
  determining if a new multidrop network device is to be added to the multidrop local network;
  determining if there is sufficient unallocated bandwidth to accommodate the new multidrop network device; and
  if there is not sufficient unallocated bandwidth, varying the bandwidth of at least one of the multidrop network devices to free up sufficient allocated bandwidth to accommodate the new multidrop network device.

11. A method for communication over a multidrop local network that includes a network mesh for receiving a plurality of multidrop network devices and the network having an operating bandwidth that determines the maximum rate of packet transfer between devices disposed on the network, comprising the steps of:
  disposing a plurality of multidrop network devices on the network;
  defining the operating data rate for each of the multidrop local network devices on the network and the bandwidth required for the operation of each of the network devices such that the required number of data packets per unit time can be received thereby, wherein the step of defining is operable to associate a priority with each of the multidrop network devices;
  allocating with a network controller on the multidrop local network a portion of the available bandwidth to each of the multidrop network devices as reserved bandwidth and the step of allocating is operable to allocate in accordance with priority; and
  denying access to an added multidrop network device when the required bandwidth thereby exceeds the reserved bandwidth.

12. The method of claim 11, wherein at least one of the multidrop network devices has the ability to vary its required bandwidth and the step of allocating will reallocate in accordance with the determined priority.

13. The method of claim 12, wherein the step of denying will deny access to a lower priority one of the multidrop network devices relative to the at least one of the multidrop network devices if it is determined in the step of allocating that there is insufficient bandwidth to accommodate the at least one of the multidrop network devices after the bandwidth requirements thereof have been changed.

14. The method of claim 12, wherein another and lower priority one of the multidrop network devices has the ability to vary the bandwidth requirements thereof and further comprising the step of varying the bandwidth requirements of the another one of the multidrop network devices down to the available bandwidth limit when the bandwidth requirements of the at least one of the multidrop network devices increases.

15. A method for communication over a multidrop local network that includes a network mesh for receiving a plurality of multidrop network devices, one of which multidrop network device is a demarcation network device and interfaces between the local network and an external network and wherein the demarcation network device transmits/receives packets at a local packet data rate to/from the local network and transmits/receives packets at an external packet data rate to/from the external network, the demarcation network device having an operating bandwidth that determines the maximum rate of packet transfer to/from the local network, comprising the steps of:
  defining the operating data rate for each of the multidrop local network devices on the network and the bandwidth required for the operation of each of the network devices such that the required number of data packets per unit time can be received thereby from the demarcation network device; and
  allocating with a network controller on the multidrop local network a portion of the available data packet transfer bandwidth of the demarcation network device to each of the multidrop network devices interfacing therewith as reserved data packet bandwidth.

16. The method of claim 15, wherein the step of defining comprises the step of adjusting the packet data rate of at least one of the multidrop network devices to the packet data rate of another of the multidrop network devices.

17. The method of claim 15, wherein at least one of the multidrop network devices has the capability to alter its data packet rate receive more or less packets of data from the demarcation network device over the local network and at least one of the other of the multidrop network devices has the capability of requesting a higher or lower bandwidth from the demarcation network device over the local network and further comprising the steps of:
  sending a request for a change in data packet bandwidth from the other of the multidrop network devices to the network controller to alter its data packet bandwidth;
  receiving by the network controller the request for an alteration in data packet bandwidth;
  controlling by the network controller the at least one of the multidrop network devices to alter its data packet bandwidth; and reallocating with the network controller the reserved amount packet data bandwidth provided by the demarcation network device for all or select ones of the multidrop network devices to accommodate the alteration in the data packet bandwidth of the at least one of the multidrop network devices.

18. The method of claim 15, wherein at least one of the multidrop network devices has a user interface with a predetermined functionality that can be changed as a function of the packet data bandwidth allocated thereto in the step of allocating and wherein the step of defining comprises the step of adjusting the packet data rate of the at least one of the multidrop network devices to a different packet data rate and changing the function of the user interface in accordance with the packet data rate.

19. The method of claim 15, and further comprising the step of denying access to an added multidrop network device to receive data packets from the demarcation network device when the required data packet bandwidth thereby exceeds the reserved data packet bandwidth.

* * * * *